US006954485B1

(12) United States Patent
Hashimoto et al.

(10) Patent No.: US 6,954,485 B1
(45) Date of Patent: Oct. 11, 2005

(54) CDMA BASEBAND RECEIVER CAPABLE OF ESTABLISHING SYNCHRONIZATION WITH PERIPHERAL BASE STATIONS

(75) Inventors: Takeshi Hashimoto, Kanagawa (JP); Yuichi Maruyama, Kanagawa (JP)

(73) Assignee: NEC Corporation, Tokyo (JP)

( * ) Notice: Subject to any disclaimer, the term of this patent is extended or adjusted under 35 U.S.C. 154(b) by 580 days.

(21) Appl. No.: 09/677,775

(22) Filed: Oct. 3, 2000

(30) Foreign Application Priority Data

Oct. 14, 1999 (JP) ................................. 11/293008

(51) Int. Cl.⁷ ............................ H04B 1/69; H04B 7/216
(52) U.S. Cl. ...................... 375/147; 375/143; 370/335; 370/342
(58) Field of Search ............................... 375/147, 142, 375/143, 233, 341; 370/335, 142, 342

(56) References Cited

U.S. PATENT DOCUMENTS

| | | | | |
|---|---|---|---|---|
| 5,111,478 A | * | 5/1992 | McDonald | 375/130 |
| 5,930,366 A | | 7/1999 | Jamal et al. | |
| 6,167,037 A | * | 12/2000 | Higuchi et al. | 370/335 |
| 6,370,134 B1 | * | 4/2002 | Aramaki | 370/342 |
| 6,625,200 B1 | * | 9/2003 | Dent | 375/142 |

FOREIGN PATENT DOCUMENTS

| | | |
|---|---|---|
| EP | 0825737 A1 | 2/1998 |
| EP | 0852430 A2 | 7/1998 |
| EP | 0944178 A2 | 9/1999 |
| JP | 10-126378 | 5/1998 |
| JP | 10-126380 | 5/1998 |
| JP | 10-200447 | 7/1998 |
| JP | 11-122141 | 4/1999 |
| JP | 11-127134 A | 5/1999 |
| JP | 11-196460 | 7/1999 |
| JP | 2001-86034 A | 3/2001 |
| WO | WO 97/33400 A1 | 9/1997 |

OTHER PUBLICATIONS

"UMTS Terrestrial Radio Access Concept Evaluation" ETSI Technical Report, XX, XX, Dec. 1997, pp. 47-48, XP002109765.
K. Higuchi, et al., "Fast cell search algorithm in DS-CDMA mobile radio using long spreading codes", Vehicular Technology Conference, 1997, IEEE 47$^{th}$ Phoenix, AZ, USA May 4-7, 1997. New York, NY, USA, IEEE, US, May 4, 1997, pp. 1430-1434, XP010229096, ISBN: 0-7803-3659-3.
F. Adachi, et al., "Coherent DS-CDMA: promising multiple access for wireless multimedia mobile communications" Spread Spectrum Techniques and Applications Proceedings. 1996., IEEE 4$^{th}$ International Symposium on Mainz, Germany, Sep. 22-25, 1996, New York, NY, USA. IEEE. US, Sep. 22, 1996, pp. 351-358, XP010208591, ISBN: 0-7803-3567-8.

* cited by examiner

Primary Examiner—Amanda T. Le
Assistant Examiner—Cicely Ware
(74) Attorney, Agent, or Firm—Sughrue Mion, PLLC

(57) ABSTRACT

A CDMA baseband receiver includes a first correlating unit, a long code phase candidate outputting section and a long code determining section. The first correlating unit calculates first correlation values from a spread modulation signal and a short code which is common to base stations. The long code phase candidate outputting section outputs selected long code phase candidates corresponding to ones selected from the first correlation values, based on the spread modulation signal, and determined long codes. The selected long code phase candidates are other than long code phase candidates for known ones of the base stations. The long code determining section generates the determined long codes for unknown ones of the base stations from the spread modulation signal, the short code, and long codes generated based on the selected long code phase candidates. Each long code is peculiar to one base station.

8 Claims, 24 Drawing Sheets

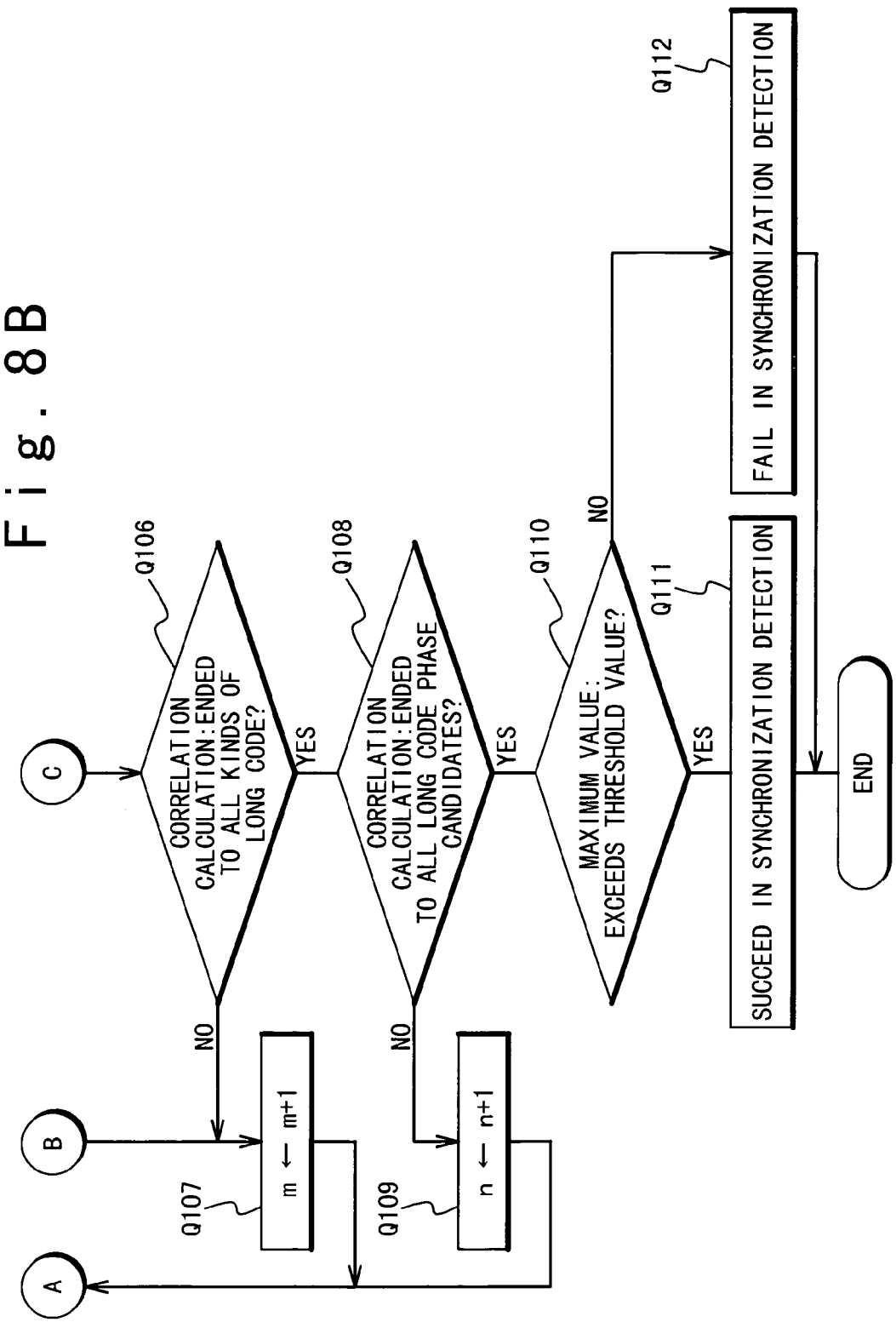

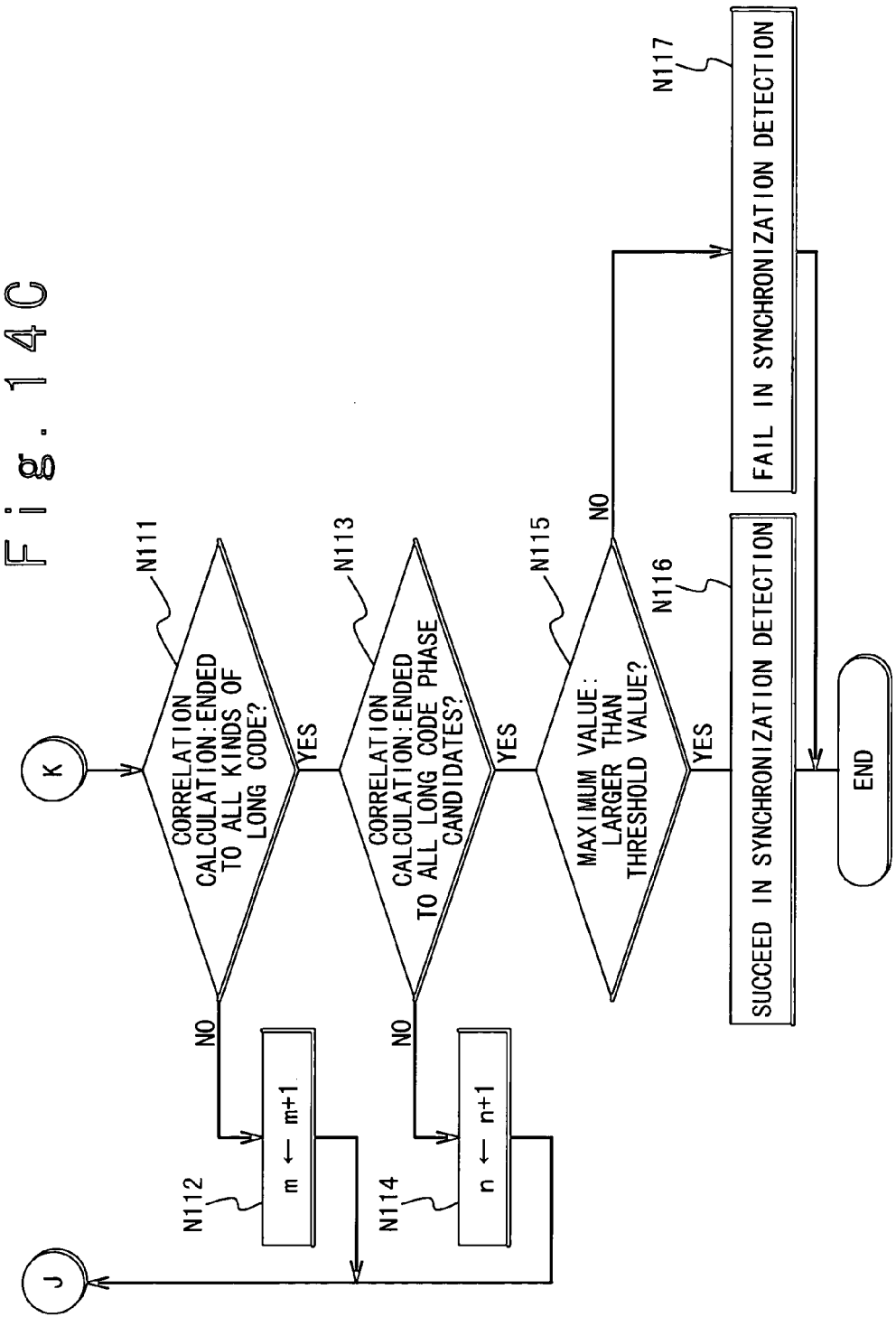

CDMA BASEBAND RECEIVER CAPABLE OF ESTABLISHING SYNCHRONIZATION WITH PERIPHERAL BASE STATIONS

BACKGROUND OF THE INVENTION

1. Field of the Invention

The present invention relates to a code division multiple access (CDMA) baseband receiver capable of establishing synchronization with peripheral base stations in high precision at the time of a peripheral cell searching operation.

2. Description of the Related Art

In such an asynchronous DS-CDMA communication system, a plurality of base stations using a same frequency band are provided for cells adjacent to each other, respectively. When the base station communicates with a mobile station, the base station transmits a double-spread signal by use of a short code having a repetitive data symbol period and being common to the base stations, and a long code having a repetitive period longer than the repetitive data symbol period and being peculiar to the base station.

In this case, when the mobile station present in a cell moves to the adjacent cell, and when the mobile station carries out simultaneous communications with a plurality of base stations, it is necessary to conduct peripheral cell searching operation to establish synchronization with the long code peculiar to the base station disposed in the adjacent cell.

Conventionally, in the above peripheral cell searching operation, simply, a long code having the maximum correlation value of the detected long codes of peripheral base stations is detected and identified as the long code of the adjacent base station.

FIG. 1 shows the structure of a conventional CDMA baseband receiver. As shown in FIG. 1, the conventional CDMA baseband receiver is mainly composed of a short code generating unit 60, a correlating unit A 61, a maximum correlation peak phase detecting unit 62, a long code generating unit 63, a correlating unit B64, a threshold value evaluating unit 65, spreading code generating units A 66-1 to 66-*m*, known base station delay profile generating units 67-1 to 67-*m*, a fundamental path detecting unit 68, demodulation correlating units (1) 69-1 to (k) 69-*k*, spreading code generating units B 70-1 to 70-*k*, and a RAKE synthesizing unit 71.

Now, referring to FIG. 1, the operation of a peripheral cell searching operation by the conventional CDMA baseband receiver will be described.

A received signal is converted into a spread modulation signal as a baseband signal in a front stage circuit, which is not shown in the figure, and is inputted to a CDMA baseband receiver. The short code generating unit 60 generates a symbol code having a data symbol period as a short code, which is common to base stations. The correlating unit A 61 carries out correlation detection of the inputted spread modulation signal by use of only the short code generated by the short code generating unit 60 during N periods as a long code period. The maximum correlation peak phase detecting unit 62 detects Q correlation values from the maximum of correlation values outputted from the correlating unit A 61 to store the correlation values and the phases thereof. The phases of the Q correlation values from the maximum are used as long code phase candidates of peripheral base stations.

The long code generating unit 63 generates Q long codes corresponding to the Q long code phase candidates outputted from the maximum correlation peak phase detecting unit 62.

The correlating unit B64 calculates correlation values between the spread modulation signal and spreading codes obtained by multiplying the short code outputted from the short code generating unit 60 by the Q long codes outputted from the long code generating unit 63 to obtain the correlation values of an A kind of long codes. The threshold value evaluating unit 65 determines a maximum one, which is equal to or greater than a predetermined threshold, of the correlation values outputted from the correlating unit B64 as the long code of an adjacent base station. Synchronization with the base station can be established by use of the determined long code.

Meanwhile, the spreading code generating units A 66-1 to 66-*m* multiply the long code, peculiar to the base station, which has been determined by the threshold value evaluating unit 65 by the short code to generate m kinds of spreading code. The known base station delay-profile generating units 67-1 to 67-*m* determines correlation values of n chip periods including the long code from the m kinds of spreading code generated by the spreading code generating units A 66-1 to 66-*m* and the spread modulation signal to generate and store a delay profile for m base stations from which signals are received.

The fundamental path detecting unit 68 detects the correlation peak phases of the P correlation values from the maximum delay profiles for the m base stations. The spreading code generating units B 70-1 to 70-*k* multiply the long code peculiar to the base station which has been determined by the threshold value evaluating unit 65 by the short code to generate k kinds of spreading code. The demodulation correlating units 69-1 to 69-*k* calculate and generate k correlation outputs between the P correlation peak phases from the fundamental path detecting unit 68 and the spreading modulation siganl, by use of the k kinds of spreading code outputted from the spreading code generating units B 70-1 to 70-*k*, respectively. The RAKE synthesizing unit 71 synthesizes the k correlation ouputs outputted from the demodulation correlating units 69-1 to 69-*k* to generate a demodulation signal of a digital signal. The demodulation signal is used to reproduce digital data bits in a rear stage circuit, which is not shown in the drawing.

In the peripheral cell searching operation carried out by the conventional CDMA baseband receiver, synchronization with the base station is established by use of a correlation peak phase obtained through correlation detection carried out using only the short code.

However, when the phases of the top Q correlation values are detected through the correlation detection carried out using only the short code common to the base stations, the correlation peak phase of a known base station is also detected, including a multi-path propagation component. In the peripheral cell searching operation of the conventional CDMA baseband receiver, it is impossible to remove the correlation peak phase of the known base station including the multi-path propagation component. Therefore, the identification of the long code is likely to be carried out by use of the long code phase of the known base station.

As mentioned above, when the long code phase of the known base station is used to carry out the long code identification, not only precision is deteriorated in establishment of synchronization with a peripheral cell, but also a searching time is likely to increase.

In addition, when the top Q correlation values are detected through the correlation detection carried out using only the short code, there is a possibility that the phases of all the detected correlation values are the correlation peak phases of known base stations. In this case, even if an appropriate peripheral base station is present, it is impossible to establish the synchronization with the base station.

In conjunction with the above description, a CDMA communication system is disclosed in Japanese Laid Open Patent Application (JP-A-Heisei 10-126378). In this reference, a base station (2) spreads and modulates a data signal using a long code and a short code. A transmitting section (13) transmits a spread modulation data signal in which the data signal is spread and modulated by only the short code for every predetermined position of the long code. A mobile station (1) receives the spread modulation data signal known base stations. In this case, even if an by a receiving section (4). A short code identifying section (7) of a control processing section (6) carries out an identifying process of the short code. A long code identifying section (8) carries out an identifying process of the long code based on the short code identifying process timing. Reception levels (correlation values) in a group for same timing of the long code are stored in a reception level table (10). A received spread modulation data signal is subjected to a despreading and demodulating operation using a long code with a maximum reception level.

Also, a DS-CDMA communication receiver is disclosed in Japanese Laid Open Patent Application (JP-A-Heisei 10-126380). In this reference, a correlation with a short code of a control channel is detected by a matched filter (22) in a searching operation. Also, a correlation peak position of the maximum power is detected as a long code timing. Next, correlating units (28-1 to 28-$n$) provided in parallel for RAKE synthesis determines a long code which is expected to the system, at the detected long code timing. After establishment of long code synchronization, a multi-path signal is received using the correlating units (28-1 to 28-$n$) to determine data through the RAKE synthesis. The identification of a long code for a peripheral cell as a candidate is carried out using the matched filter (22) in the peripheral cell searching operation. A signal from a communicating base station is received using the correlating units (28-1 to 28-$n$) and realizes hand-over at safety.

Also, a DS-CDMA communication receiver is disclosed in Japanese Laid Open Patent Application (JP-A-Heisei 10-200447). In this reference, a baseband reception signal is supplied to a matched filter (1) to calculate a correlation with a spreading code from a spreading code generating unit (2). A signal power calculating section (3) calculates power of correlation values outputted from the matched filter (1) to output a long code synchronization timing determining section (4), a threshold value calculating section (5), and a long code identifying section (6). A spreading code generating section (2) short code #0 common to control channels of the base stations in an initial cell searching operation. After a long code synchronization timing is determined, each piece of an N chip as a part of a spreading code sequence as a synthesis code of a long code #i peculiar to the base station and a short code #0 is outputted while being replaced.

Also, an initial synchronization capturing method is disclosed in Japanese Laid Open Patent Application (JP-A-Heisei 11-122141). In this reference, a transmitting station sets one or both of kind and phase of a long code peculiar to the transmitting station at an optional timing after a mask block in the mask block (a) and transmits the mask block. A receiving station demodulates the mask block to acquire one or both of kind and phase of the long code for a channel to be connected and the optional timing. Thus, the initial synchronization capturing method is attained.

Also, a spreading code synchronizing method is disclosed in Japanese Laid Open Patent Application (JP-A-Heisei 11-196460). In this reference, it is supposed that s(0) to s(3) are correlation detection output vectors obtained through correlation detection between a code obtained by multiplying a long code and a common short code and a reception signal for intervals (correlation detection interval 1) #0 to #3 of the reception signal. The phase is rotated in so based on data (+1 or −1 in this example) of a symbol. Therefore, when a vector summation of s( ) is calculated, the correlation is cancelled between the symbols so that high precision correlation detection cannot be carried out. Therefore, a correlation is calculated between the reception signal and the common short code at the reception timing of the mask symbol B, and a data modulation component and an amplitude and phase fluctuation due to fading are removed from s( ) using the correlation detection output (despread signal) vector p(B).

SUMMARY OF THE INVENTION

Accordingly, the present invention is accomplished in view of the above-described circumstances, and an object of the present invention is to provide a CDMA baseband receiver capable of establishing synchronization with a peripheral base station with high precision in a short time at a peripheral cell searching operation in a CDMA communication system.

In order to achieve an aspect of the present invention, a CDMA baseband receiver includes a first correlating unit, a long code phase candidate outputting section and a long code determining section. The first correlating unit calculates first correlation values from a spread modulation signal and a short code which is common to base stations. The long code phase candidate outputting section outputs selected long code phase candidates corresponding to ones selected from the first correlation values, based on the spread modulation signal, and determined long codes. The selected long code phase candidates are other than long code phase candidates for known ones of the base stations. The long code determining section generates the determined long codes for unknown ones of the base stations from the spread modulation signal, the short code, and long codes generated based on the selected long code phase candidates. Each long code is peculiar to one base station.

It is desirable that the correlation values corresponding to the selected long code phase candidates are larger than a first predetermined threshold value.

Also, the long code phase candidate outputting section may output correlation peak phases corresponding to selected ones for a first predetermined number of second correlation values for the known base stations.

Also, the long code phase candidate outputting section may include a maximum correlation peak phase detecting unit, spreading code generating units, delay profile generating units, and a phase detecting unit. The maximum correlation peak phase detecting unit detects and holding as long code phase candidates, peak phases corresponding to the first correlation values for a second predetermined number from a maximum one of the first correlation values and higher than a second predetermined threshold value. The spreading code generating units generate spreading codes from the short code and the determined long codes, respectively. The delay profile generating units generate delay profiles for the known base stations based on the generated spreading codes, respectively. The phase detecting unit removes long code phase candidates corresponding to peak phases for the generated delay profiles from the held long code phase candidates, and outputs the remaining long code phase candidates as the selected long code phase candidates to the long code determining section.

Also, the long code phase candidate outputting section may include a peak phase storage memory, spreading code generating units, delay profile generating units, a phase detecting unit, and a maximum correlation peak phase detecting unit. The spreading code generating units generate spreading codes from the short code and the determined long codes, respectively. The delay profile generating units generate delay profiles for the known base stations based on the generated spreading codes, respectively. The phase detecting unit detects ones higher than a third predetermined threshold value from among third correlation values calculated from the generated delay profiles and stores peak phases corresponding to the detected third correlation value in the peak phase storage memory. The maximum correlation peak phase detecting unit compares a second predetermined threshold value and each of the first correlation values, and detects peak phases corresponding to ones for a second predetermined number from a maximum one of the first correlation values larger than the second predetermined threshold value. Also, the maximum correlation peak phase detecting unit compares each of the detected peak phases and the stored peak phases in the peak phase storage memory to remove the stored peak phases from the detected peak phases, and outputs remaining peak phases as the selected long code phase candidates to the long code determining section. In this case, the long code phase candidate outputting section may further include a path detecting unit which outputs the stored peak phases for the known base stations.

Also, the long code phase candidate outputting section may include a correlation value storage memory, spreading code generating units, delay profile generating units, a phase detecting unit, a mask setting and storing section and a maximum correlation peak phase detecting unit. The correlation value storage memory stores the first correlation values. The spreading code generating units generate spreading codes from the short code and the determined long codes, respectively. The delay profile generating units generate delay profiles for the known base stations based on the generated spreading codes, respectively. The phase detecting unit detects ones higher than a third predetermined threshold value from among third correlation values calculated from the generated delay profiles. The mask setting and storing section stores peak phases corresponding to the detected third correlation values and sets ones corresponding to the stored peak phases of the first correlation values stored in the correlation value storage memory to lower values than a second predetermined threshold value. The maximum correlation peak phase detecting unit compares the second predetermined threshold value and each of the first correlation values stored in the correlation value storage memory. Also, the maximum correlation peak phase detecting unit outputs peak phases corresponding to ones for a second predetermined number from a maximum one of the first correlation values larger than the second predetermined threshold value as the selected long code phase candidates to the long code determining section. In this case, the long code phase candidate outputting section may further include a path detecting unit which outputs the stored peak phases for the known base stations.

In another aspect of the present invention, a method of determining long codes for unknown base stations in a CDMA baseband receiver, is attained by calculating first correlation values from a spread modulation signal and a short code which is common to base stations, by outputting selected long code phase candidates corresponding to ones selected from the first correlation values, based on the spread modulation signal, and determined long codes, the selected long code phase candidates being other than long code phase candidates for known ones of the base stations, and by determining long codes for the unknown base stations from the spread modulation signal, the short code, and long codes generated based on the selected long code phase candidates, each long code is peculiar to one base station.

In this case, it is desirable that the correlation values corresponding to the selected long code phase candidates are larger than a first predetermined threshold value. Also, the outputting selected long code phase candidates may further includes outputting correlation peak phases corresponding to selected ones for a first predetermined number of second correlation values for the known base stations.

Also, the outputting of selected long code phase candidates may be attained by detecting and holding as long code phase candidates, peak phases corresponding to the first correlation values for a second predetermined number from a maximum one of the first correlation values and higher than a second predetermined threshold value, by generating spreading codes from the short code and the determined long codes, respectively, by generating delay profiles for the known base stations based on the generated spreading codes, respectively, by removing long code phase candidates corresponding to peak phases for the generated delay profiles from the held long code phase candidates, and by outputting the remaining long code phase candidates as the selected long code phase candidates to the long code determining section.

Also, the outputting of selected long code phase candidates may be attained by generating spreading codes from the short code and the determined long codes, respectively, by generating delay profiles for the known base stations based on the generated spreading codes, respectively, by detecting ones higher than a third predetermined threshold value from among third correlation values calculated from the generated delay profiles and stores peak phases corresponding to the detected third correlation value in the peak phase storage memory, by comparing a second predetermined threshold value and each of the first correlation values, by detecting peak phases corresponding to ones for a second predetermined number from a maximum one of the first correlation values larger than the second predetermined threshold value, by comparing each of the detected peak phases and the stored peak phases in the peak phase storage memory to remove the stored peak phases from the detected peak phases, and by outputting remaining peak phases as the selected long code phase candidates to the long code determining section. In this case, the stored peak phases may be outputted for the known base stations.

Also, the outputting of selected long code phase candidates may be attained by storing the first correlation values in a correlation value storage memory, by generating spreading codes from the short code and the determined long codes, respectively, by generating delay profiles for the known base stations based on the generated spreading codes, respectively, by detecting ones higher than a third predetermined threshold value from among third correlation values calculated from the generated delay profiles, by storing peak phases corresponding to the detected third correlation values, by setting ones corresponding to the stored peak phases of the first correlation values stored in the correlation value storage memory to lower values than a second predetermined threshold value, by comparing the second predetermined threshold value and each of the first correlation values stored in the correlation value storage memory, and by outputting peak phases corresponding to ones for a second predetermined number from a maximum one of the first correlation values larger than the second predetermined threshold value as the selected long code phase candidates to the long code determining section. In this case, the stored peak phases may be outputted for the known base stations.

BRIEF DESCRIPTION OF THE DRAWINGS

FIGS. 8A and 8B are flowcharts showing an initial base station synchronization establishing process carried out when there is no synchronizing base station, in the first embodiment;

FIGS. 14A to 14C are flowcharts illustrating the processing procedures of a peripheral cell searching operation carried out when synchronization with one or more base stations is established in the second embodiment;

DESCRIPTION OF THE PREFERRED EMBODIMENTS

Hereinafter, a CDMA baseband receiver according to embodiments of the present invention will be described below in detail with reference to the attached drawings. The description will be provided in detail with reference to the following embodiments.

First Embodiment

Figure 1:
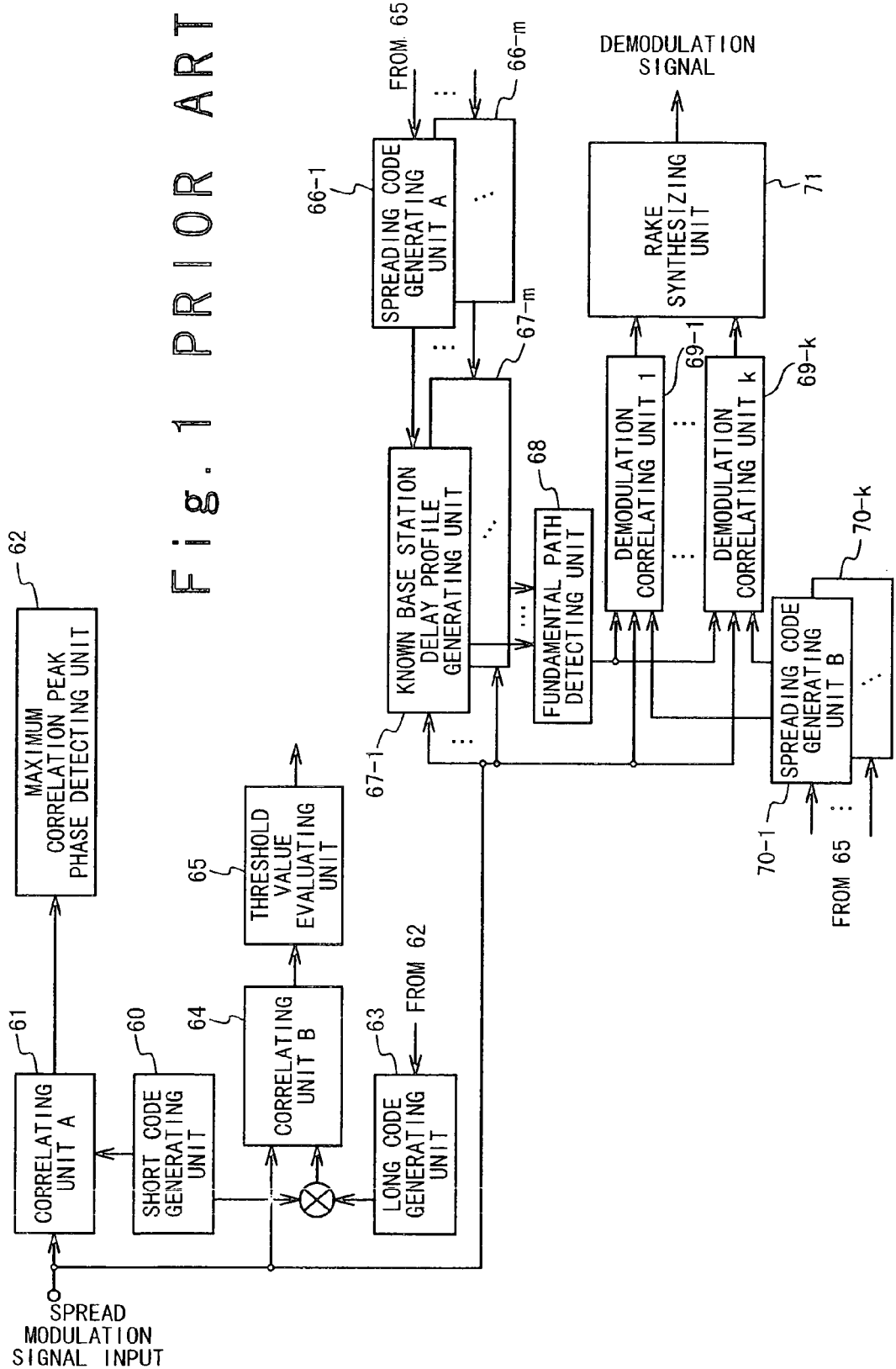
FIG. 1 is a diagram showing the structure of a conventional CDMA baseband receiver.
Figure 2:
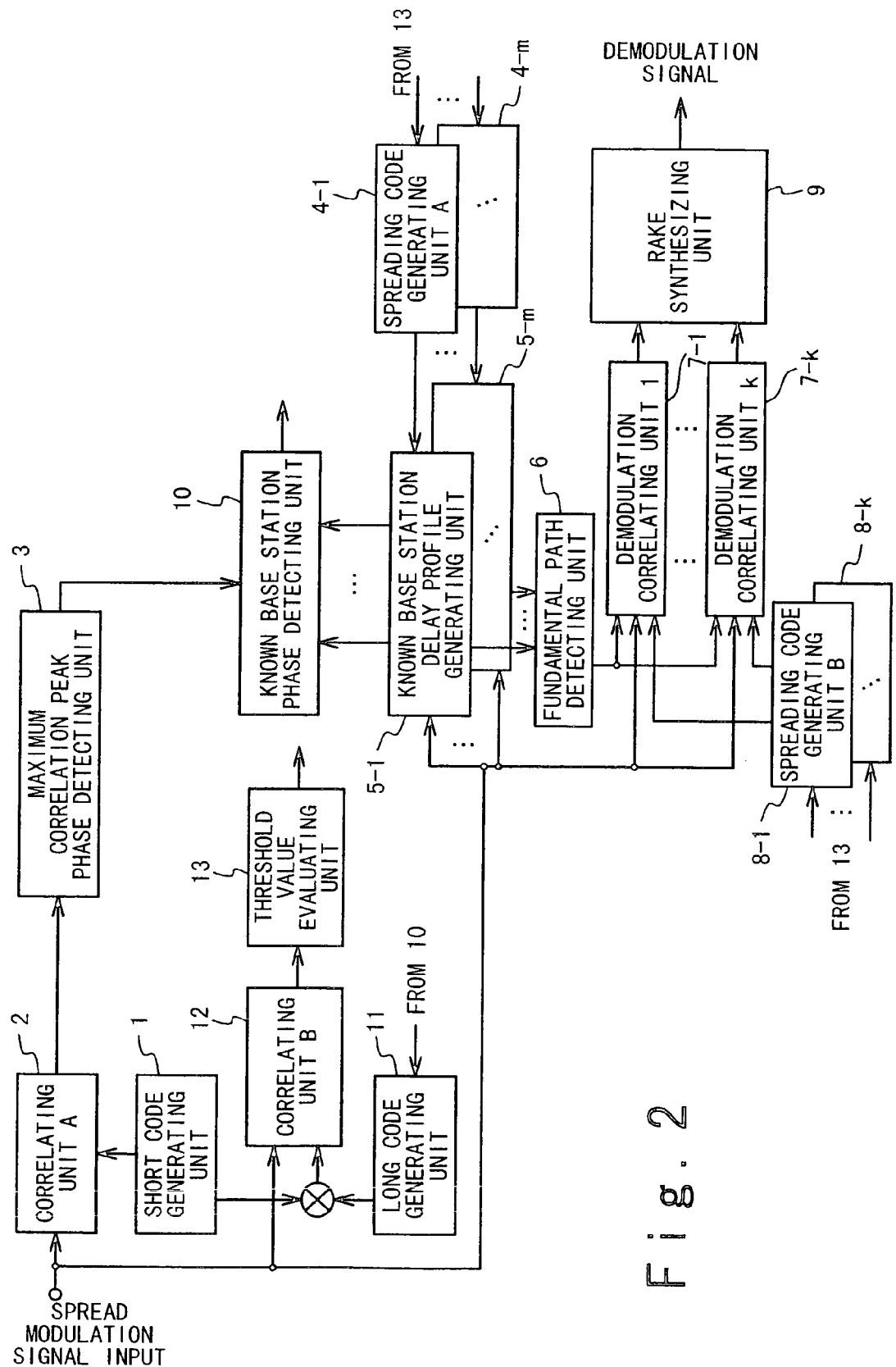
FIG. 2 is a block diagram showing the structure of a CDMA baseband receiver according to a first embodiment of the present invention.
Figure 3:
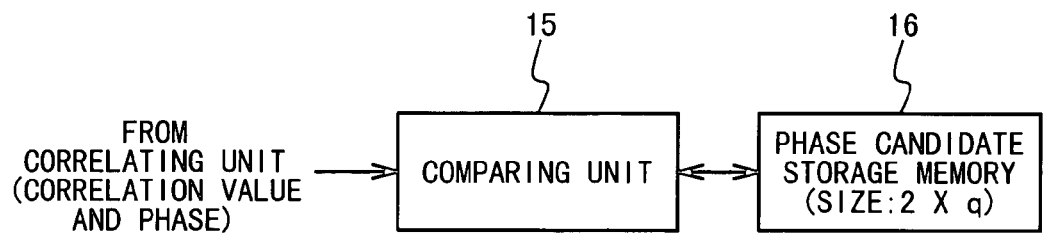
FIG. 3 is a block diagram showing an example of the structural of a maximum correlation peak phase detecting unit in the first embodiment.
Figure 4:
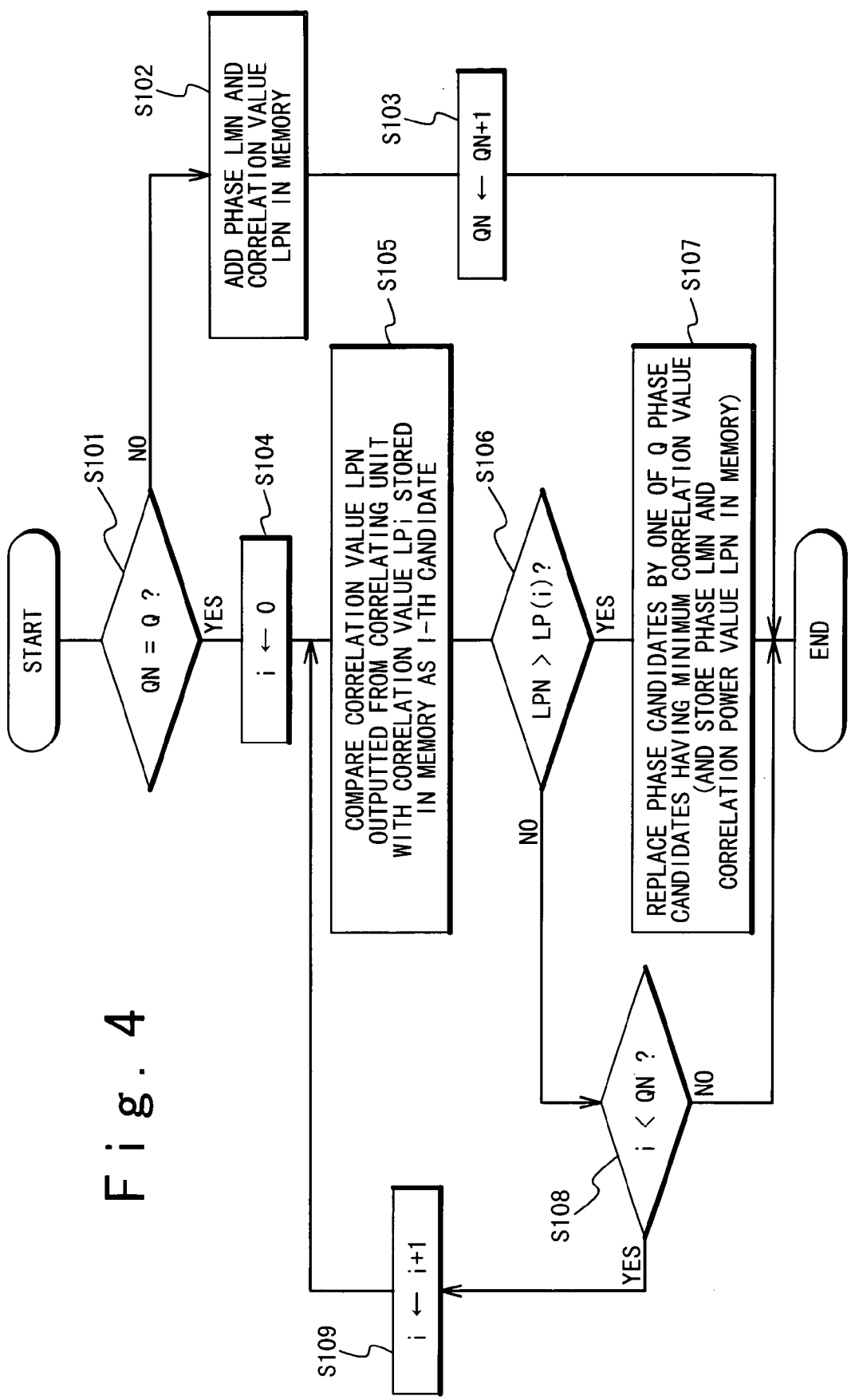
FIG. 4 is a flowchart showing an example of the processing of the maximum correlation peak phase detecting unit in the first embodiment.
Figure 5:
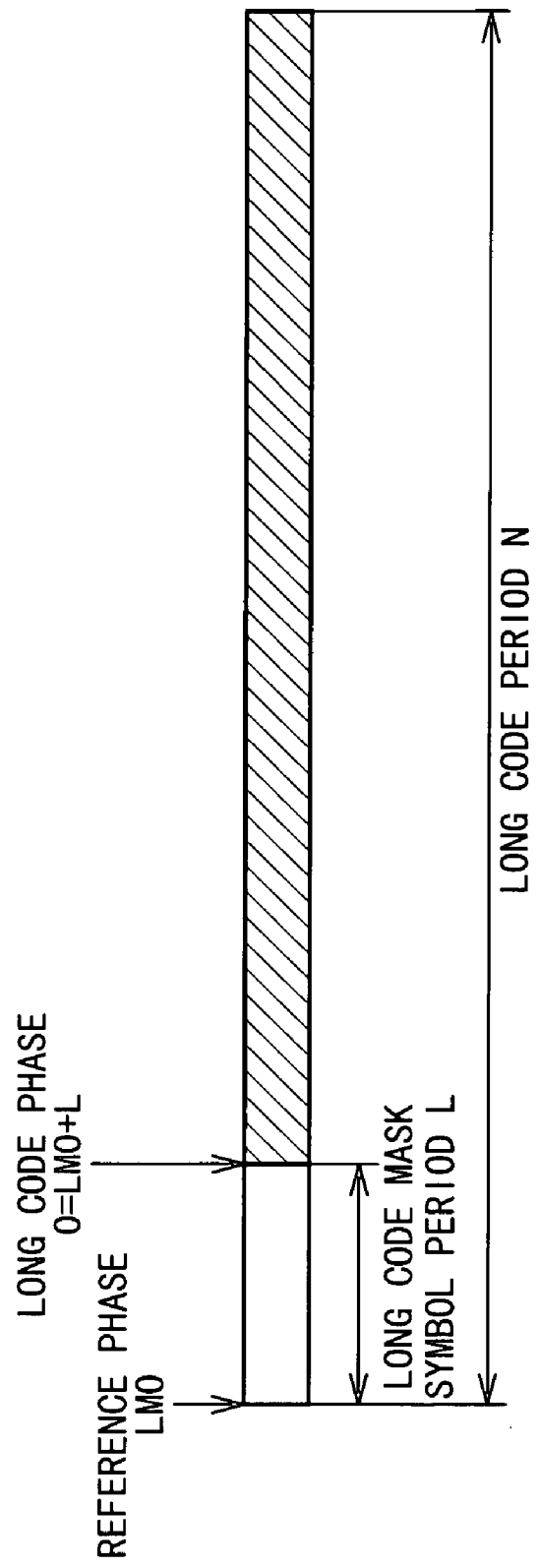
FIG. 5 is a diagram showing an example of the relationship between a long code mask symbol phase and a long code phase.
Figure 6:
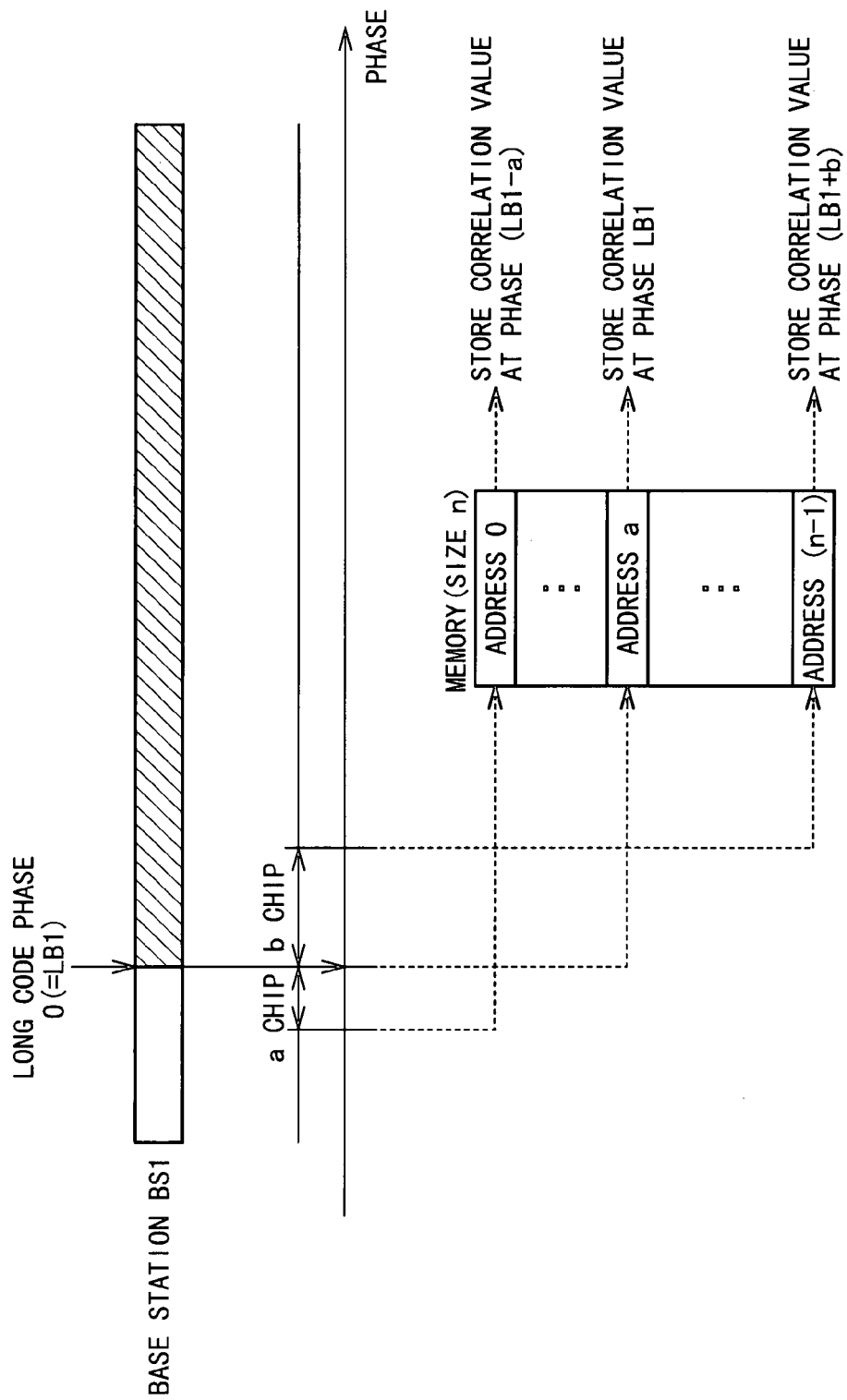
FIG. 6 is a diagram for illustrating a delay profile generated by a known base station delay profile generating unit.
Figure 7:
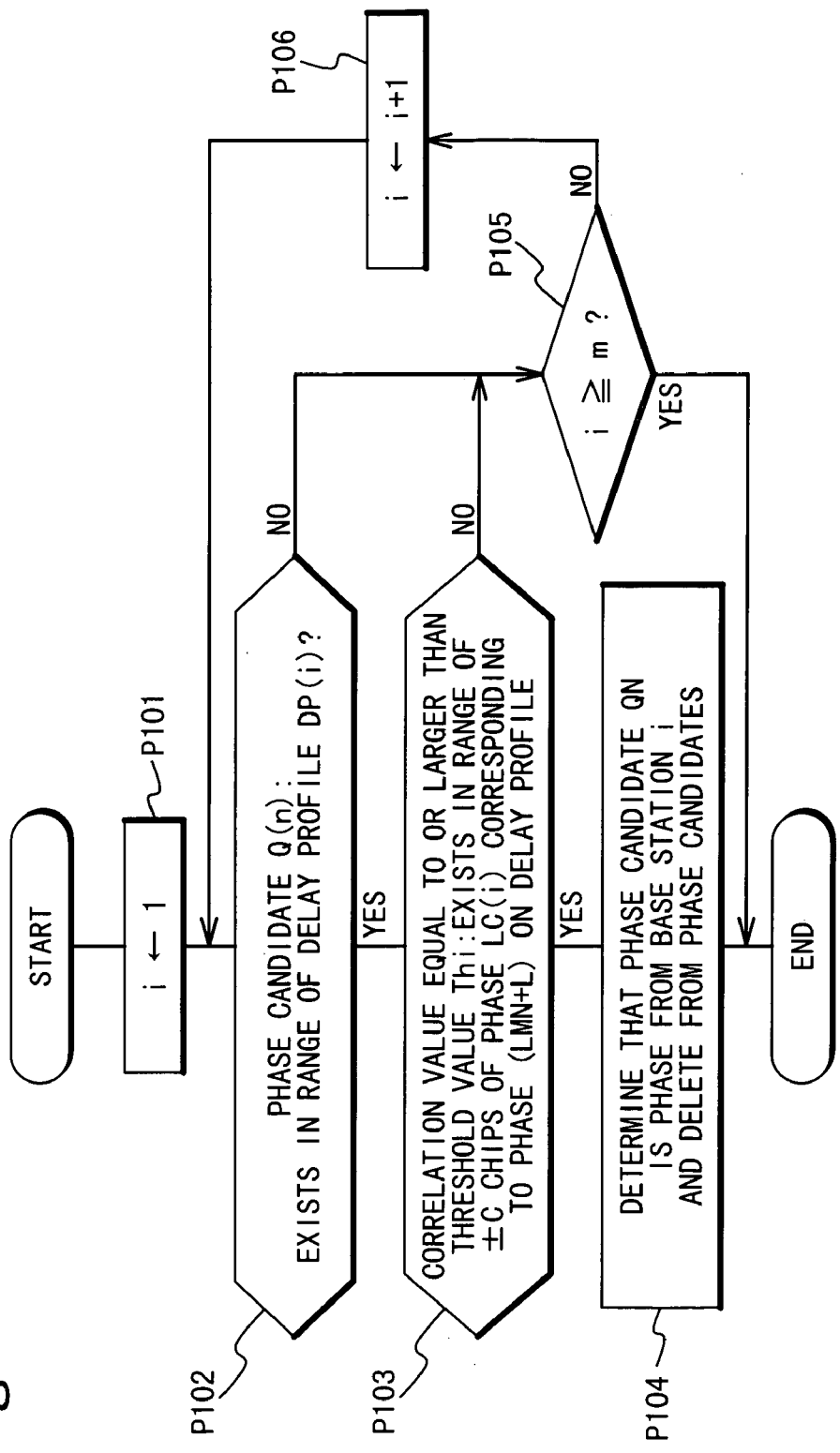
FIG. 7 is a diagram showing an example of algorithm of the known base station delay profile generating unit in the first embodiment.
Figure 8A:
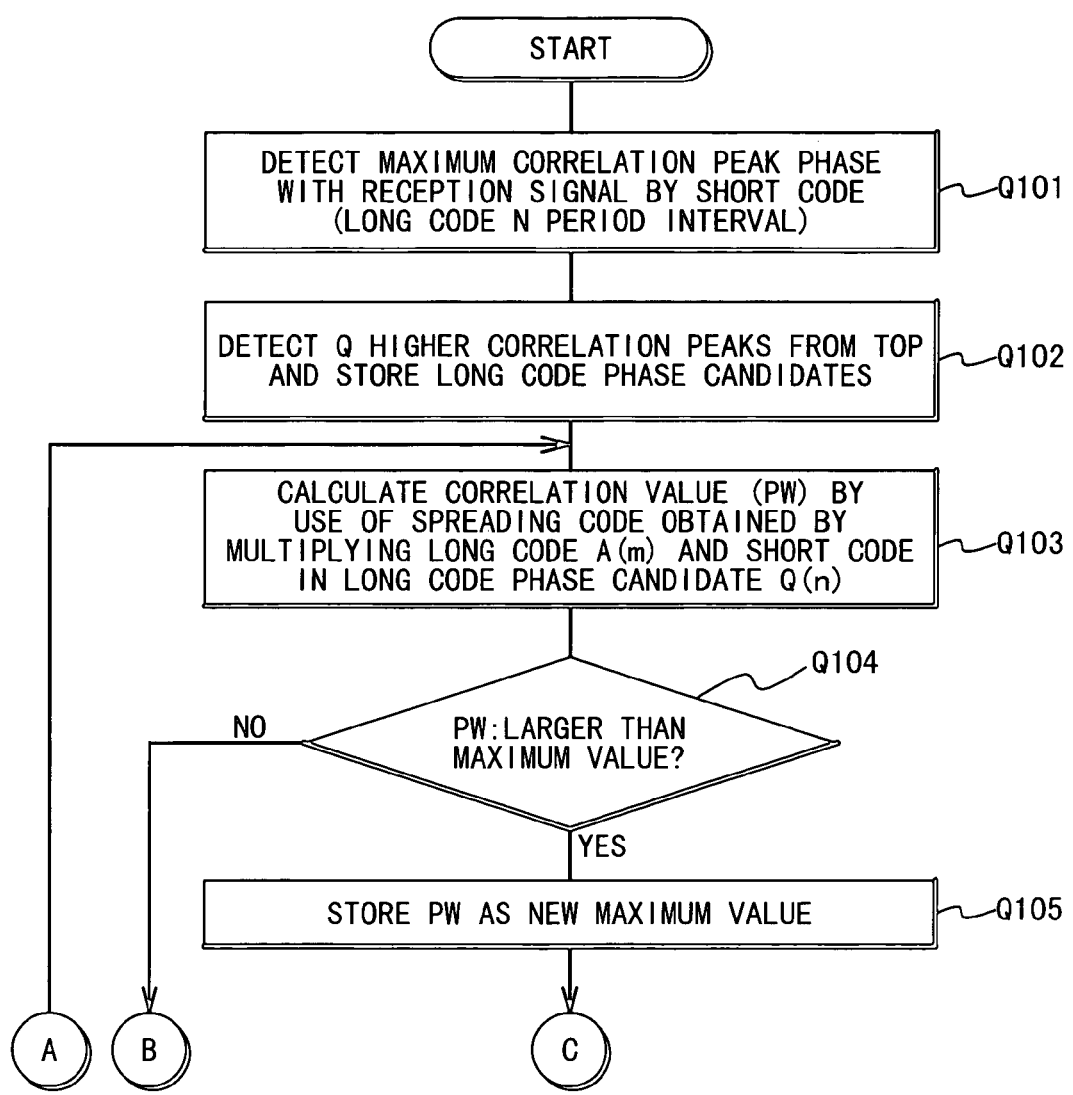
Figure 9:
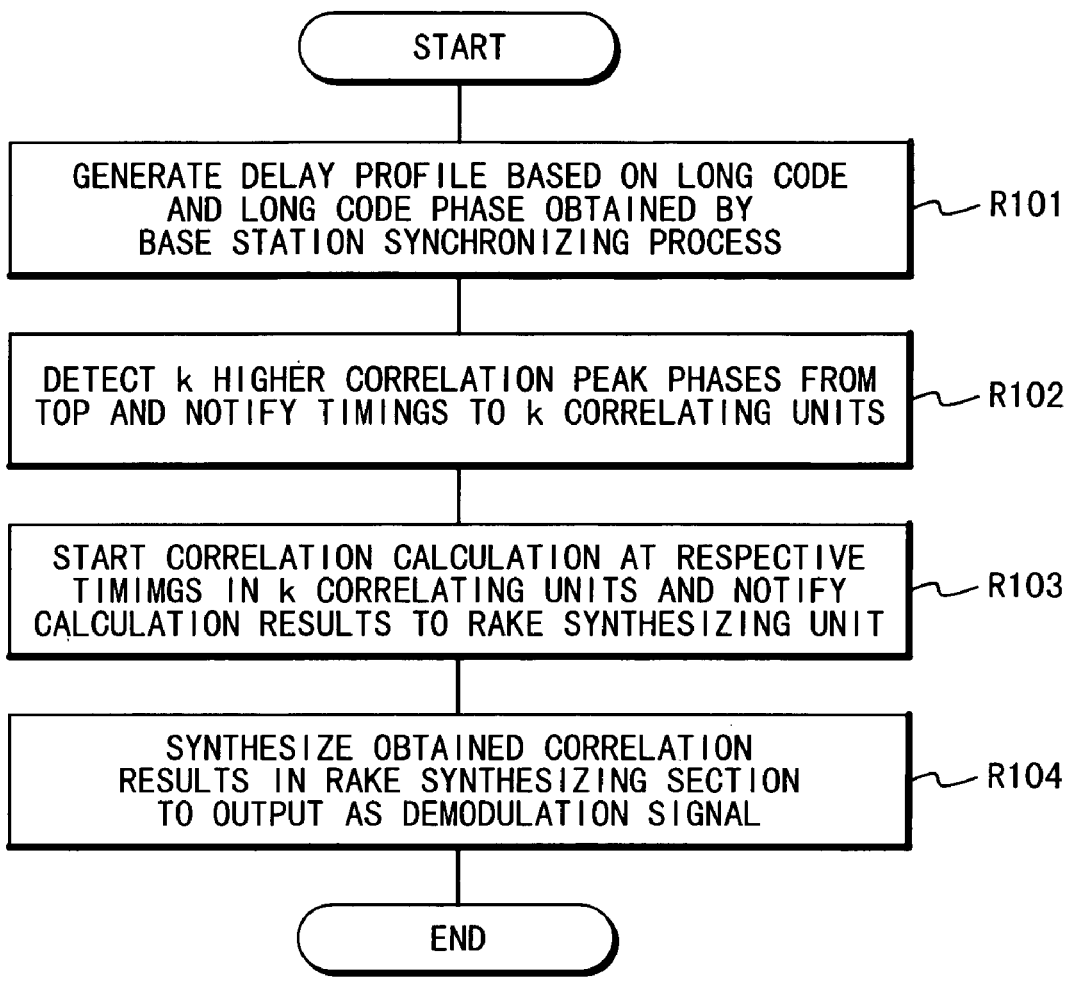
FIG. 9 is a flowchart showing the processing procedures from synchronization detection to demodulation in the initial base station synchronization establishing process in the first embodiment.
Figure 10A:
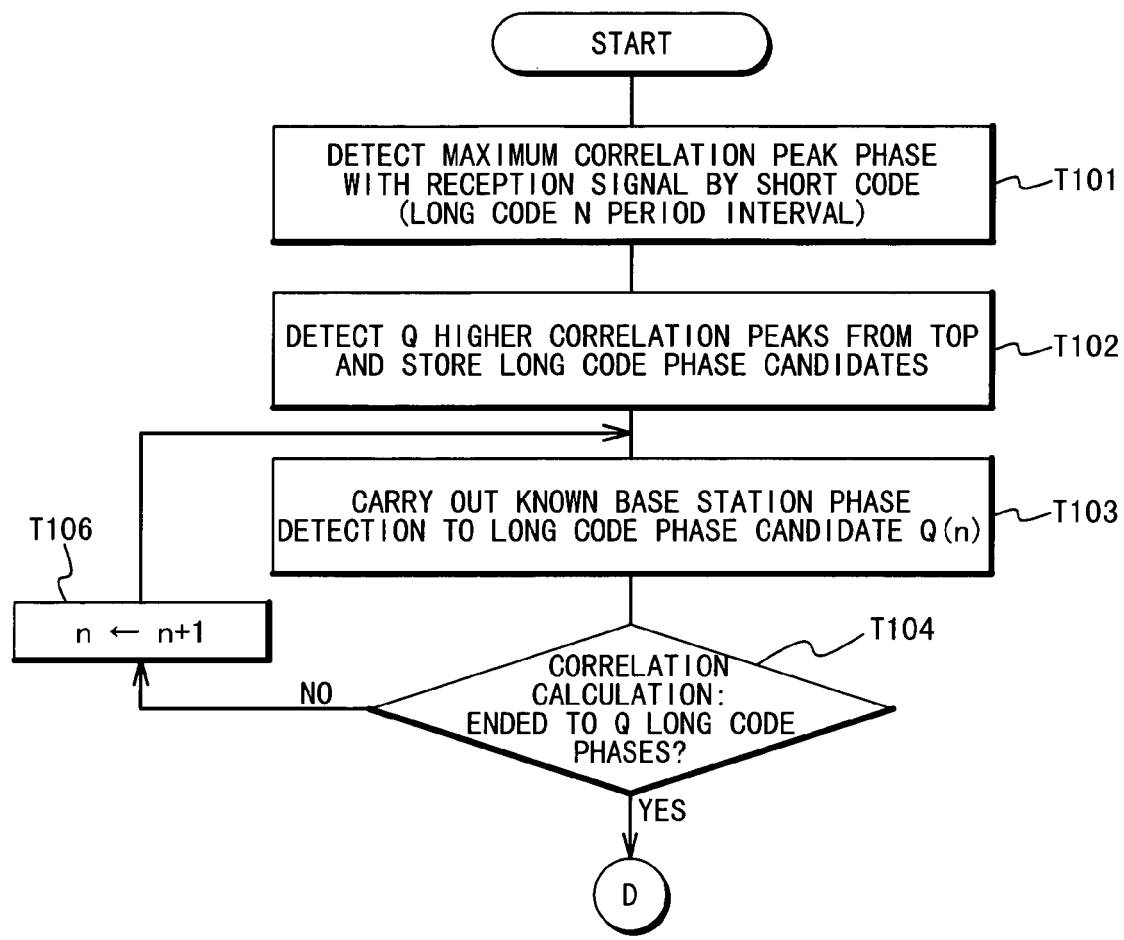
FIGS. 10A to 10C are flowcharts showing the processing procedures of a peripheral cell searching operation carried out when synchronization with one or more base stations can be established, in the first embodiment.
Figure 10B:
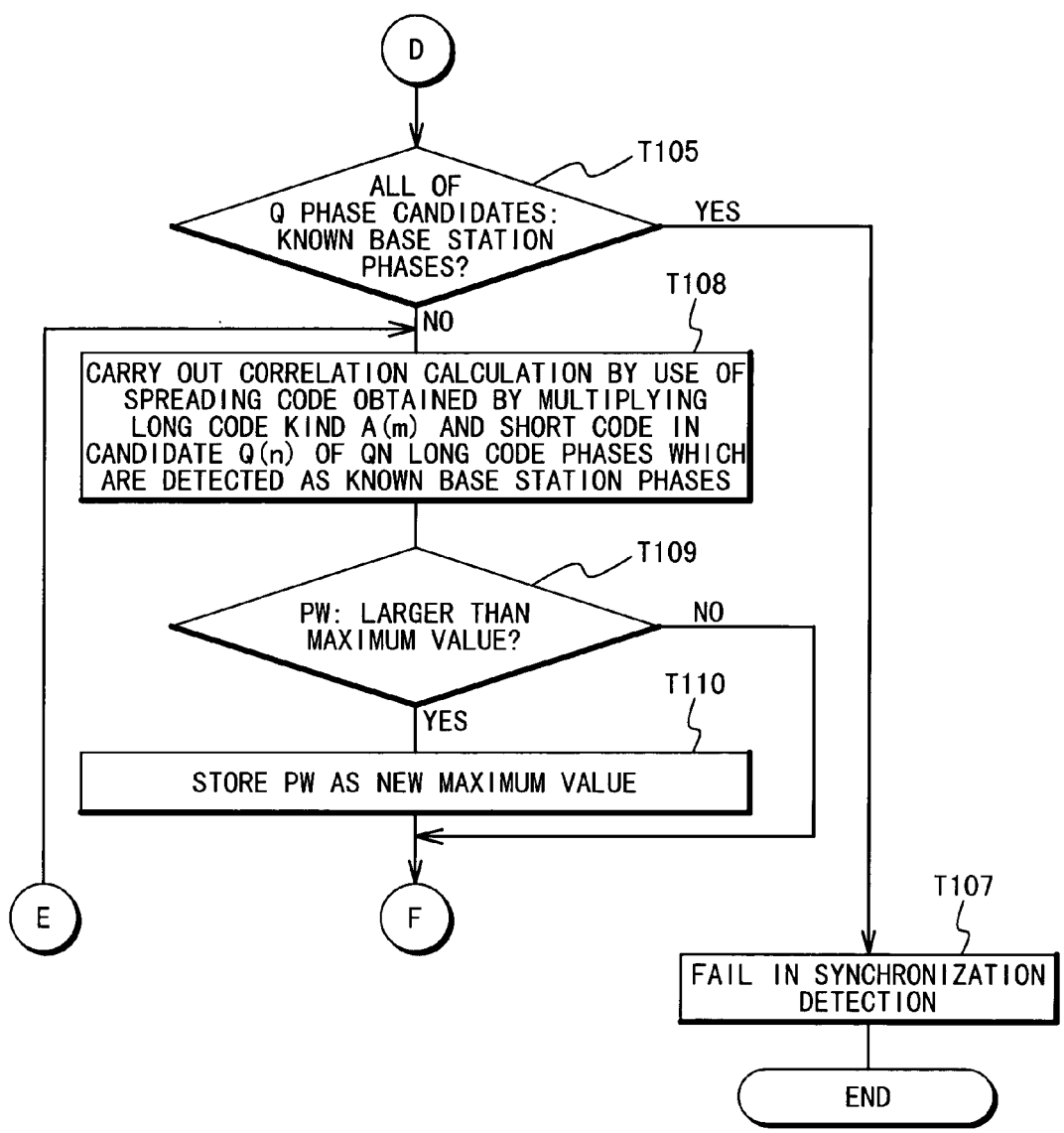
Figure 10C:
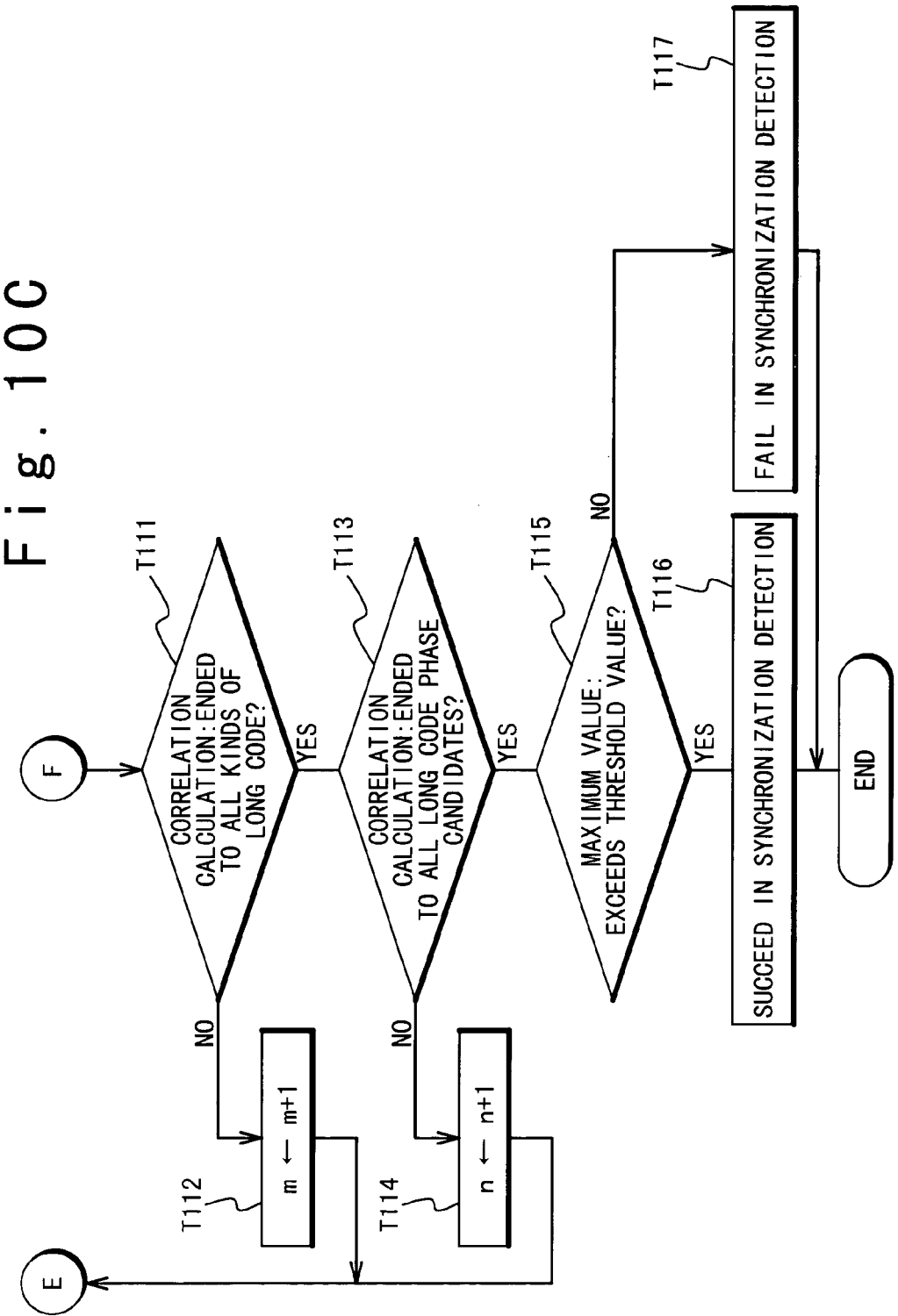

FIG. 2 is a block diagram showing the structure of a CDMA baseband receiver according to a first embodiment of the present invention. FIG. 3 is a block diagram showing a structural example of a maximum correlation peak phase detecting unit used in the first embodiment. FIG. 4 is a flowchart showing an example of the operation of the maximum correlation peak phase detecting unit used in the first embodiment. FIG. 5 is a view showing an example of the relationship between a long code mask symbol phase and a long code phase. FIG. 6 is a diagram for illustrating a delay profile generated by a known base station delay profile generating unit. FIG. 7 is a diagram showing an example of algorism of the known base station delay profile generating unit used in the first embodiment. FIGS. 8A and 8B are flowcharts showing the procedures of an initial process of synchronizing with a base station in the first embodiment when there is no base station in which synchronization has been established. FIG. 9 is a flowchart showing the procedure from synchronous detection to demodulation in the initial base station synchronizing process in the first embodiment. FIGS. 10A, 10B, and 10C are flowcharts showing the procedures of a peripheral cell searching operation carried out when synchronization with one or more base stations can be established.

As shown in FIG. 2, the CDMA baseband receiver of the first embodiment is mainly composed of a short code generating unit 1, a correlating unit A 2, a maximum correlation peak phase detecting unit 3, spreading code generating units A 4-1 to 4-$m$, known base station delay profile generating units 5-1 to 5-$m$, a fundamental path detecting unit 6, demodulation correlating units 7-1 to 7-$k$, spreading code generating units B 8-1 to 8-$k$, a RAKE synthesizing unit 9, a known base station phase detecting unit 10, a long code generating unit 11, a correlating unit B 12, and a threshold value evaluating unit 13.

The short code generating unit 1 generates a short period spreading code (short code) common to base stations and having the same repetitive period as the data symbol period. The correlating unit A 2 carries out correlation value calculation between the short code generated by the short code generating unit 1 and a received spread modulation signal during N (N is an arbitrary natural number determined depending on system) periods which is the same as a long code period. The maximum correlation peak phase detecting unit 3 detects top Q (Q is an arbitrary natural number) correlation values as Q ones from the maximum among correlation values calculated by the correlating unit A 2. Then, the maximum correlation peak phase detecting unit 3 stores the detected Q correlation values and the Q correlation peak phases corresponding to the Q correlation values. After this, the Q correlation peak phases are used as long code phase candidates.

The spreading code generating units A 4-1 to 4-$m$ multiply long code peculiar to base stations obtained through a phase synchronizing process by the threshold value evaluating unit 13 by the short code to generate $m$ ($m$ is the maximum number of receivable base stations determined depending on system) spreading codes. The known base station delay profile generating units 5-1 to 5-$m$ calculate correlation values in n (n is a natural number determined depending on the performance of the receiver) chip periods including the long code phases by use of the spread modulation signal and the spreading codes generated by the spreading code generating units A 4-1 to 4-$m$. Then, the known base station delay profile generating units 5-1 to 5-$m$ generate and store delay profiles for the m base stations from which signals are being received.

The fundamental path detecting unit 6 detects the correlation peak phases for the top P (P is an arbitrary natural number and P≦k) correlation values from the delay profiles generated by the known base station delay profile generating units 5-1 to 5-$m$. The demodulation correlating unit 7-1 to 7-$k$ use spreading codes generated by the spreading code generating units B 8-1 to 8-$k$ to carry out correlation calculation with the spread modulation signal in each of the P correlation peak phases supplied from the fundamental path detecting unit 6. The spreading code generating units B 8-1 to 8-$k$ multiply the long codes peculiar to the respective base stations determined by the threshold value evaluating unit 13 by the short code to generate k (k is a natural number determined depending on the performance of the receiver) spreading codes. The RAKE synthesizing unit 9 synthesizes k correlation outputs from the demodulation correlating units 7-1 to 7-$k$ to output a demodulation signal.

The known base station phase detecting unit 10 compares the Q long code phase candidates obtained by the maximum correlation peak phase detecting unit 3 with the m delay profiles obtained by the known base station delay profile generating units 5-1 to 5-$m$ to detect whether or not correlation peaks exist in the same phases as any of the long code phase candidates. Then, after removing the long code phase candidates having the same phases as those of the correlation peak phases from the Q long code phases, the known base station phase detecting unit 10 outputs the remaining long code phase candidates. The long code generating unit 11 generates a long code having the same phase as each of the remaining long code phase candidates outputted from the known base station phase detecting unit 10.

The correlating unit B 12 carries out correlation value calculation between the spread modulation signal and spreading codes obtained as the result of multiplication of a spread short code generated by the short code generating unit 1 and the long codes generated by the long code generating unit 11, in which the known base station long codes are removed. The threshold value evaluating unit 13 selects a long code for the maximum value of the correlation values calculated by the correlating unit B 12 as a long code candidate. When the correlation value is equal to or greater than a predetermined threshold, the threshold value evaluating unit 13 determines the long code as the long code peculiar to a base station to establish synchronization with the base station. When the correlation value is less than the predetermined threshold, correlation calculation is carried out for the next long code phase candidate by the correlating unit B 12.

Next, referring to FIG. 3, a structural example of the maximum correlation peak phase detecting unit 3 will be described below.

As shown in FIG. 3, the maximum correlation peak phase detecting unit 3 is composed of a comparing unit 15 and a phase candidate storage memory 16.

The comparing unit 15 compares the calculation result of correlation value from the correlating unit A 2 with each of sets of phase and correlation value of the long code phase candidates from the phase candidate storage memory 16. As the result of comparison by the comparing unit 15, the phase candidate storage memory 16 stores the phases of the inputted Q long code phase candidates in odd-numbered addresses and stores the correlation values thereof in even-numbered addresses.

Next, referring to FIG. 4, an example of the process carried out by the maximum correlation peak phase detecting unit 3 will be described.

It is now supposed that, QN sets of phase and correlation value are stored in the phase candidate storage memory 16 at the time of a phase LMN. It is checked whether or not the value of QN is equal to the value of Q (step S101). When the value of QN is less than the value of Q, the phase LMN and the correlation value LPN are stored in the phase candidate storage memory 16 (step S102). When the value of QN is equal to the value of Q (step S101), the comparing unit 15 compares a correlation value LPN outputted from the correlating unit A 2 with the QN correlation values stored in the phase candidate storage memory 16 (step S105 and step S106). When the correlation value LPN is greater than any of the Q correlation values, the phase for the minimum correlation value of the Q correlation values and the minimum correlation value are removed and the phase LMN and the correlation value LPN are stored in memory 16 (step S107).

Next, referring to FIG. 5, the relationship between the phase of a long code mask symbol and a long code phase will be described below.

The relationship between the phase of a long code mask symbol and the long code phase is defined based on a base station system, and is known to a receiving side. When the length of the long code mask symbol (the long code mask symbol period) is set as L chips, a time when the time for L chips have passed from the correlation peak phase (reference phase LMO) is calculated as the long code phase (0=LMO+L).

Next, referring to FIG. 6, the delay profiles generated by the known base station delay profile generating units 5-1 to 5-$m$ will be described below.

In the period of n chips including the long code phase LB(i) of a known base station BS(i), correlation values are calculated and stored in the memory. It is supposed that a delay profile generation range is set as the period of a chip before the long code phase 0 (=LB(i)) and as the period of b chips thereafter (n−a+(b+1)). Also, it is supposed that the correlation values are calculated for every one-chip period. In this case, a correlation value at a phase (LB(i)−a) is stored in the memory address number 0, and a correlation value at a phase (LB(i)+b) is stored in the memory address number (n−1). In addition, the correlation value in the phase LB(i) is stored in the memory address number a. In this case, a delay profile storage memory has a memory capacity of M×n in accordance with the maximum number k of receivable base stations, and the delay profiles for m currently known base stations are generated.

Next, referring to FIG. 7, a description will be 5 given of the example of algorism of the known base station phase detecting unit 10.

Now, it is supposed that a correlation peak phase candidate Q(n) is detected at the phase LMN. At this time, delay profiles DP1 to DPk for k of known base stations BS1 to BSK have been generated. When the long code phase of the base station BS(i) is LB(i), the range of the delay profile is between the (LB(i)−a) and (LB(i)+b). The known base station phase detecting unit 10 checks whether or not a phase (LMN+L) exists within the delay profile range for the base station BS(i). That is, when (LB(i)−a)≦(LMN+L)≦(LB(i)+b), the correlation peak phase candidate Q(n) is determined to be present within the range of the delay profile DP(i) (step P102).

When the correlation peak phase candidate Q(n) is present within the range of the delay profile DP(i), the memory in which the delay profile DP(i) is stored is referred to and it is checked whether or not a correlation peak is present in a phase LC(i) corresponding to the phase (LMN+L) on the delay profile (step P103). In this case, however, the periods of C chips before and after the phase LC(i) are added to a peak value detection range in consideration of that the peak existing on the delay profile has a certain width.

When a correlation value equal to or greater than a threshold THi exists in the periods of C chips before and after the phase LC(i), it is determined that the correlation peak exists in a position corresponding to the phase (LMN+L) on the delay profile, and the correlation peak phase candidate Q(n) is removed from the phase candidate storage memory 16 (step P104). When the correlation peak is not over the threshold THi and does not exist within the peak value detection range of the delay profile, similar detection is carried out to the delay profile for the next base station (step P105 and step P106).

After the k delay profiles are checked, the remaining correlation peak phase candidates are notified to the long code generating unit 11 as long code phase candidates. The threshold THi and the additional peak value detection range C can be optionally set to the known base station phase detecting unit 10 for each base station.

The detailed explanation of each of the short code generating unit 1, the correlating unit A 2, the spreading code generating units A 4-1 to 4-m, the fundamental path detecting unit 6, the demodulation correlating unit 7-1 to 7-k, the spreading code generating units B 8-1 to 8-k, the RAKE synthesizing unit 9, the long code generating unit 11, the correlating unit B 12, and the threshold value evaluating unit 13 will be omitted since it is less significant in the present invention.

Next, the operation of the CDMA baseband receiver shown in FIG. 2 will be described with reference to flowcharts shown in FIGS. 8A and 8B, a flowchart shown in FIG. 9, and flowcharts shown in FIGS. 10A, 10B, and 10C.

First, referring to FIGS. 8A and 8B, an initial base station synchronization establishing process carried out when there is no base station with which communication is being carried out.

In the correlating unit A 2, correlation peak phase detection is carried out by use of only a short code during the period of N chips corresponding to a long code period (step Q101). When the maximum correlation peak phase detecting unit 3 detects Q long code phase candidates (step Q102), generation of delay profiles is not carried out since there is no communicating base station. Thus, the phase detection of known base stations by the known base station phase detecting unit 10 is not carried out.

Correlation values are calculated with the long code phase candidates detected by the correlating unit B 12 by use of spreading codes obtained by multiplying the long codes by the short code (step Q103). Then, correlation calculation is carried out to all the Q long code phase candidates (step Q106 and step Q107). Then, the correlation calculation is carried to all of an A kind of long codes (step Q108 and step Q109). After that, the maximum correlation value of all and the phase corresponding to the maximum correlation value can be obtained (step Q105).

The threshold value evaluating unit 13 is applied to the maximum correlation value (step Q110). When the maximum correlation value is equal to or greater than a predetermined threshold, the threshold value evaluating unit 13 determines the phase corresponding to the maximum correlation value as a long code phase, and determines the kind of the long code as the long code peculiar to a base station. Then, the initial base station synchronization establishing process is completed (step Q111). When the maximum correlation value is less than the predetermined threshold, it is determined that no base station is found. Thus, it is determined that the initial synchronization establishment is failed (step Q112), and the initial synchronization establishing process is ended.

Next, referring to FIG. 9, the process from synchronous detection to demodulation in the initial base station synchronization establishing process.

The spreading code generating unit A 4-1 generates spreading codes by use of the detected kind of long code and the long code phase to the base station BS1 obtained through the synchronization detection in the initial base station synchronization establishing process. The known base station delay profile generating unit 5-1 generates a delay profile DP1 (step R101). Top k correlation values are detected from the delay profile (step R102). The demodulation correlating units 7-1 to 7-k are operated based on the phases of the detected correlation values (step R103), and then, the outputs from the demodulation correlating units 7-1 to 7-k are synthesized into a modulation signal by the RAKE synthesizing unit 9 (step R104).

Next, referring to FIGS. 10A, 10B, and 10C, the operation for establishing synchronization with another peripheral base station (peripheral cell searching operation) carried out when synchronization with one or more base stations is already established will be described below.

The correlating unit A 2 detects correlation peak phases by use of only the short code during the N-chip period for the long code period (step T101). The maximum correlation peak phase detecting unit 3 detects the Q long code phase candidates (step T102).

When it is supposed that there are m synchronized base stations (known base stations), the known base station delay profile generating units 5-1 to 5-m generate delay profiles for the m base stations. The delay profiles are used to determine demodulation timing for the demodulation correlating units 7-1 to 7-k.

In the correlation peak phase detection carried out by the correlating unit A 2 and the maximum correlation peak phase detecting unit 3, the correlation detection of symbols spread by use of only the short code common to the base stations is carried out. As a result, there is a possibility that the detected Q long code phase candidates include the phases of the known base stations. In contrast, the delay profiles are generated from correlation values calculated based on spreading codes obtained by multiplying the short code by long codes which are different between the base stations. Therefore, the correlation peak for every base station can be obtained.

With reference to the delay profiles, the known base station phase detecting unit 10 detects the phases of the known base stations. The known base station phase detecting unit 10 removes phases that are identified as the phases of the known base stations, from the Q long code phase candidates (step T103, step T104, and step T106). The operation of the known base station phase detecting unit 10 is shown in detail in FIG. 7.

The known base station phase detecting unit 10 determines whether or not all of the detected long code phase candidates are the phases of the known base stations (step T105). When they are all identified as the known base station phases, the known base station phase detecting unit 10 determines that no peripheral cells can be found and terminates the peripheral cell searching operation at this point of time (step T107).

In addition, the known base station phase detecting unit 10 carries out a long code identifying process of the QN long code phase candidates (QN≦Q), which are not identified as the known base station phases.

The correlating unit B 12 calculates correlation values of the A kind of long codes for each of all the detected QN long code phase candidates (step T108 to step T114). Of these correlation peak phase candidates, the threshold value evaluating unit 13 carries out threshold evaluation to the correlation peak phase candidate having the maximum correlation value (step T115). The phase of the correlation value equal to or greater than a predetermined threshold is identified as a long code phase, and the long code in this case is identified as the long code for the base station. After this, the peripheral cell searching operation is completed (step T116). When the correlation value is less than the predetermined threshold, it is determined that no peripheral base station is found, and then the peripheral cell searching operation is terminated (step T117).

In this way, the CDMA baseband receiver in this embodiment can provide the following advantages.

First, at the time of the peripheral base station searching operation, with reference to the delay profiles of known base stations, the phases of the known base stations are removed from long code phase candidates obtained through correlation detection carried out by use of only a short code. As a result, only the long code phase candidates of peripheral base stations can be detected, whereby precision in synchronization detection with the peripheral base stations can be improved.

In other words, the long code phase candidates used for the long code identifying process do not include the phases of the known base stations. Therefore, there is no possibility that the long code phase of the known base station detected in the threshold evaluation is erroneously detected as the long code kind. Thus, the long code phases of peripheral base stations and the kinds of the long codes thereof can be detected reliably.

When the above example is not applied, there may be a case in which all of the detected Q long code phase candidates are the phases of the known base stations. In such a case, even when an appropriate peripheral base station exists, there is a possibility that the base station may not be found. However, in accordance with the above example, there is no such a problem.

Secondly, since the phases of the known base stations are removed other than the phases of synchronization detection, synchronization with peripheral base stations and detection of the presence or absence of the peripheral base stations can be carried out at high speeds. That is, the time S required to carry out a base station searching operation in a case to which the embodiment is not applied can be obtained by the following equation:

$$S = X + Q \times R \times A \tag{1}$$

where A is the kind of the long code to be searched, Q is the number of long code phase candidates obtained through correlation detection based on a short code, P is the number of correlation peaks of the known base stations existing in the correlation peak phase candidates, R is the time necessary for calculating the correlation of one kind of long code in the long code identifying process, and X is a time required to carry out correlation calculation for obtaining the Q correlation peak phase candidates. When the Q correlation peak phase candidates are all the phases of known base stations, phase synchronization with peripheral base stations cannot be established. Consequently, it is determined that the peripheral base station searching operation is failed. Thus, the time S is required to determine whether or not the searching operation has failed.

In contrast, in the case of the above embodiment, the time S' necessary to carry out a base station searching operation is expressed by the following equation.

$$S' = X + (Q-P) \times R \times A \tag{2}$$

In this case, when the Q correlation peak phase candidates are all the phases of the known base stations, the time necessary to determine that the peripheral base station searching operation is failed is equivalent to X. In addition, by selecting the Q correlation peak phase candidates in which the correlation peak phases of the known base stations have been removed, the peripheral base stations can be detected within the time S, and the determination of whether or not a peripheral station exists can also be made.

Second Embodiment

Figure 11:
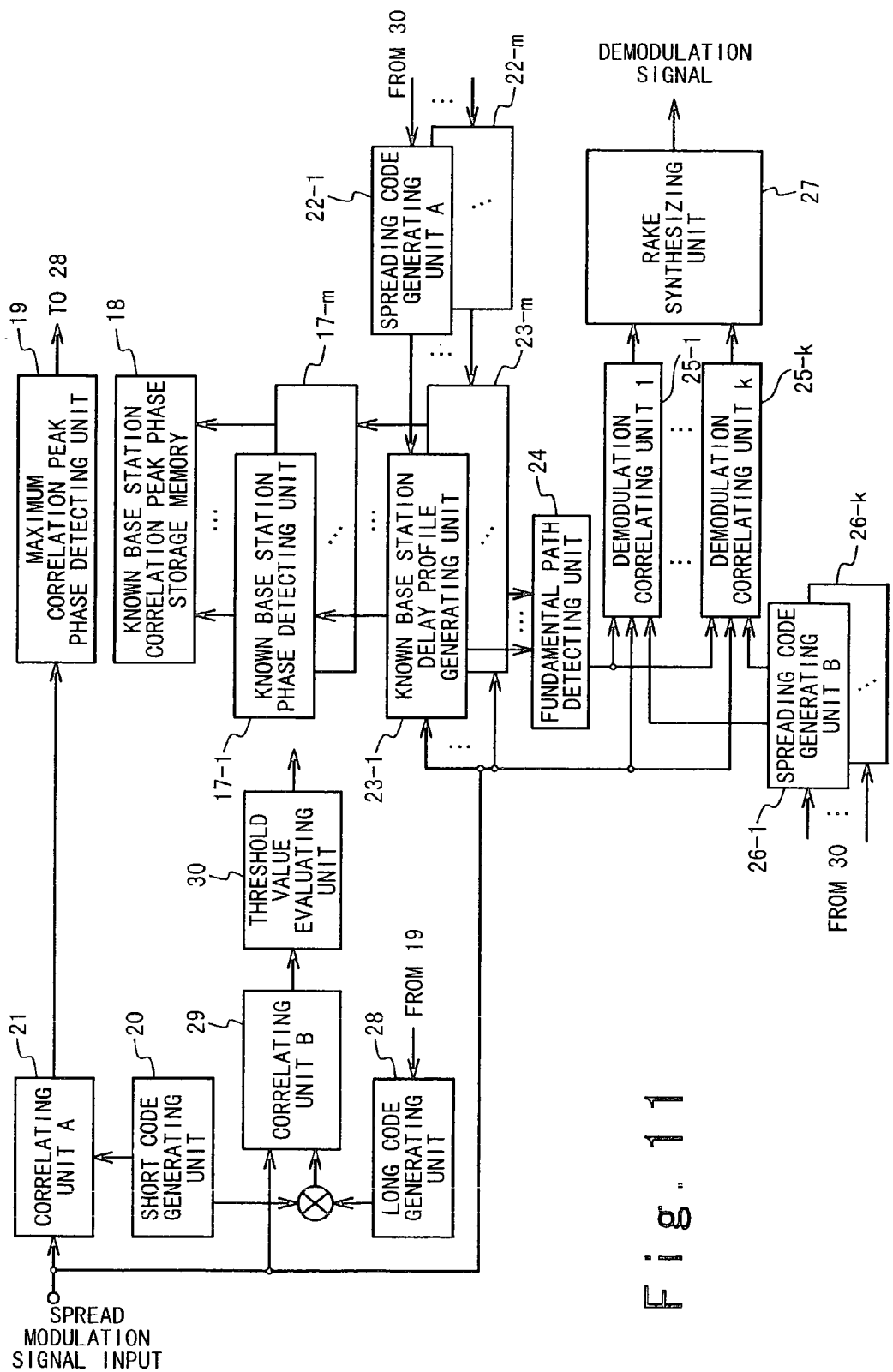
FIG. 11 is a block diagram showing the structure of a CDMA baseband receiver according to a second embodiment of the present invention.
Figure 12:
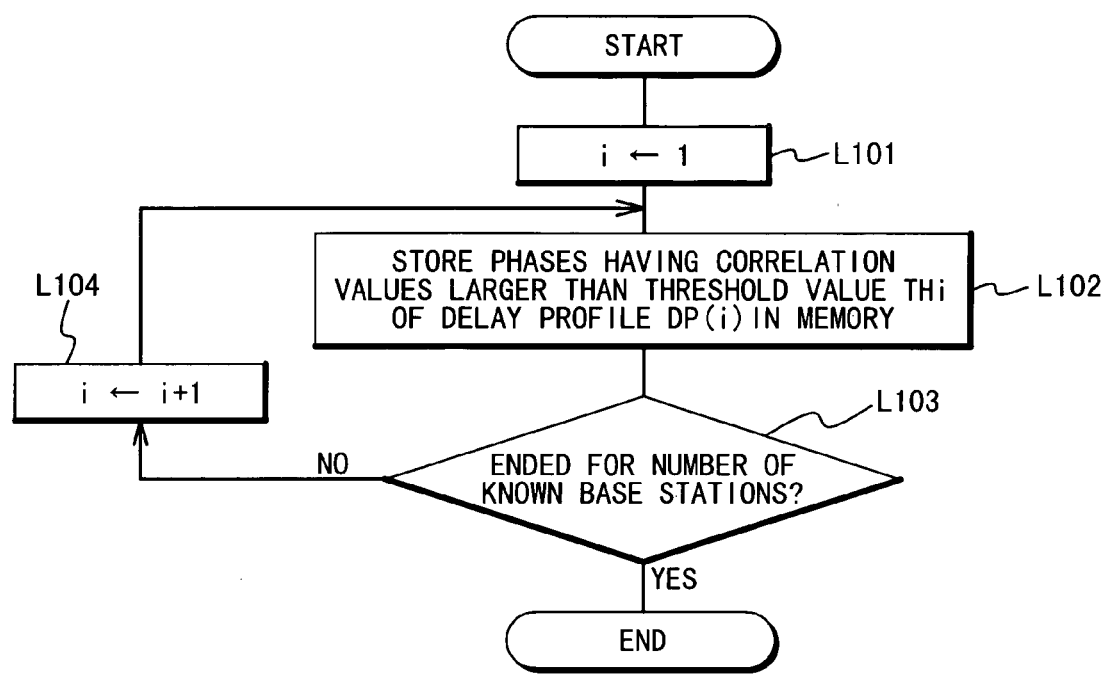
FIG. 12 is a flowchart illustrating the processing procedure of a known base station correlation peak phase detecting unit according to the second embodiment.
Figure 13A:
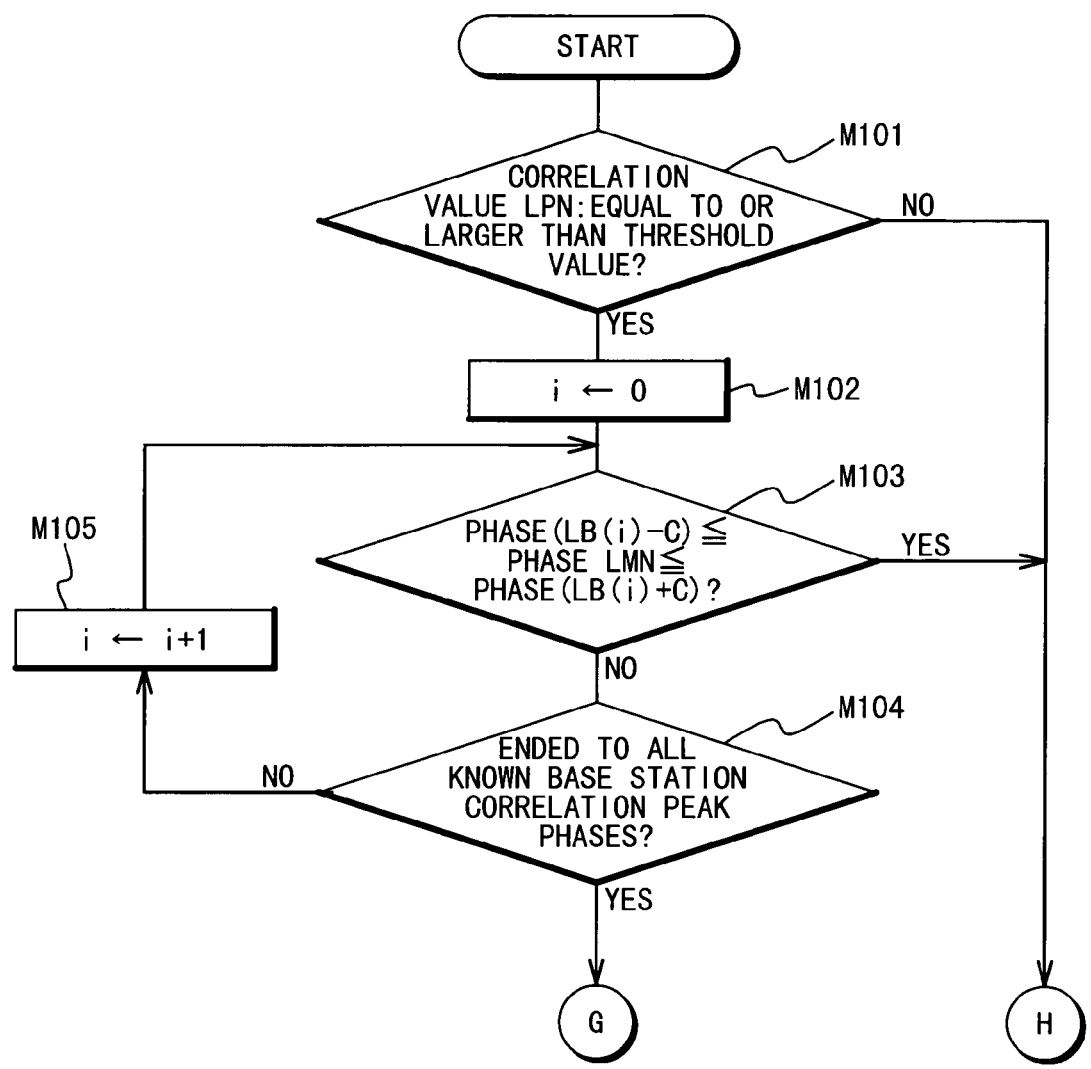
FIGS. 13A and 13B are flowcharts illustrating the processing procedure of a maximum correlation peak phase detecting unit in the second embodiment.
Figure 13B:
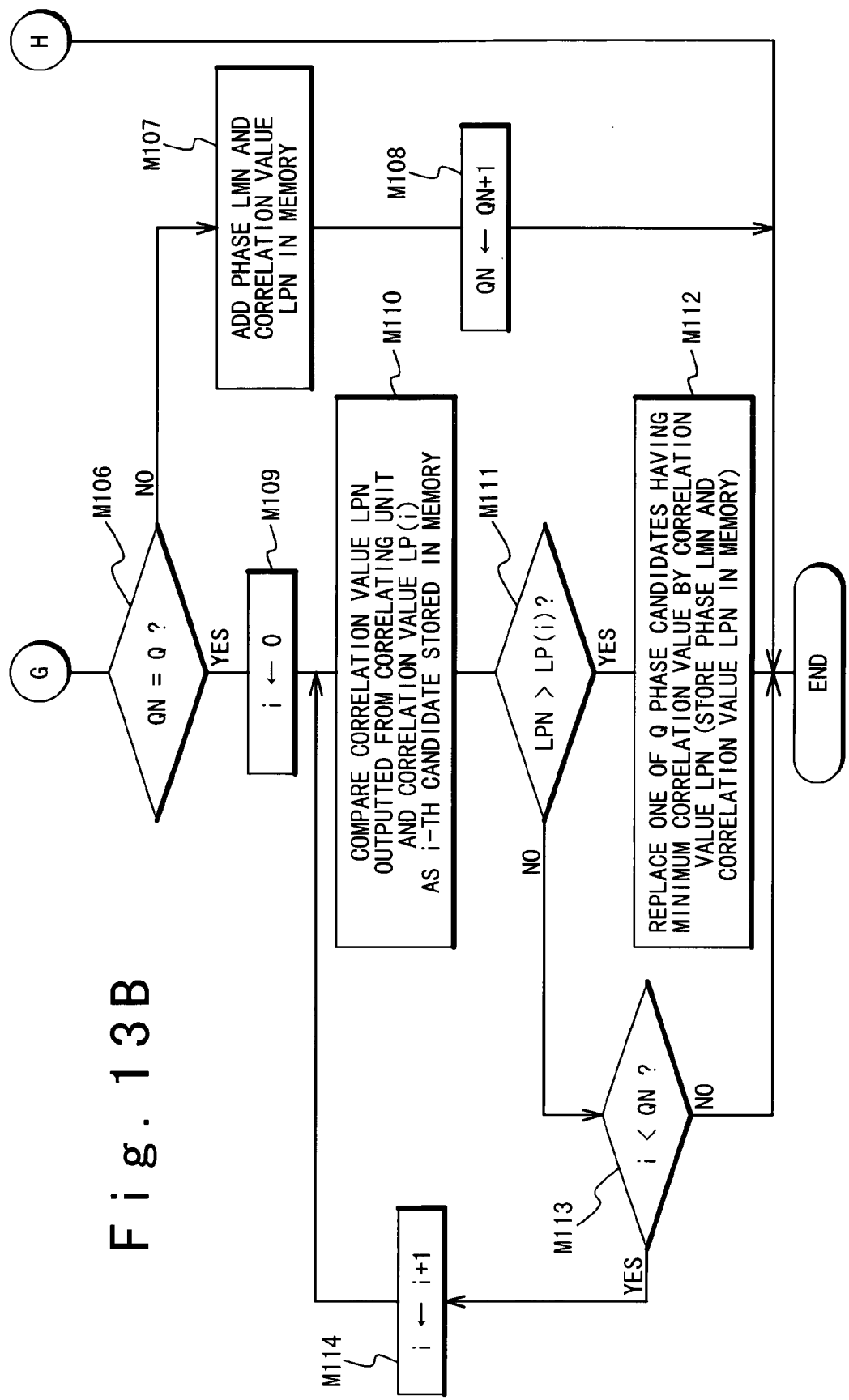
Figure 14A:
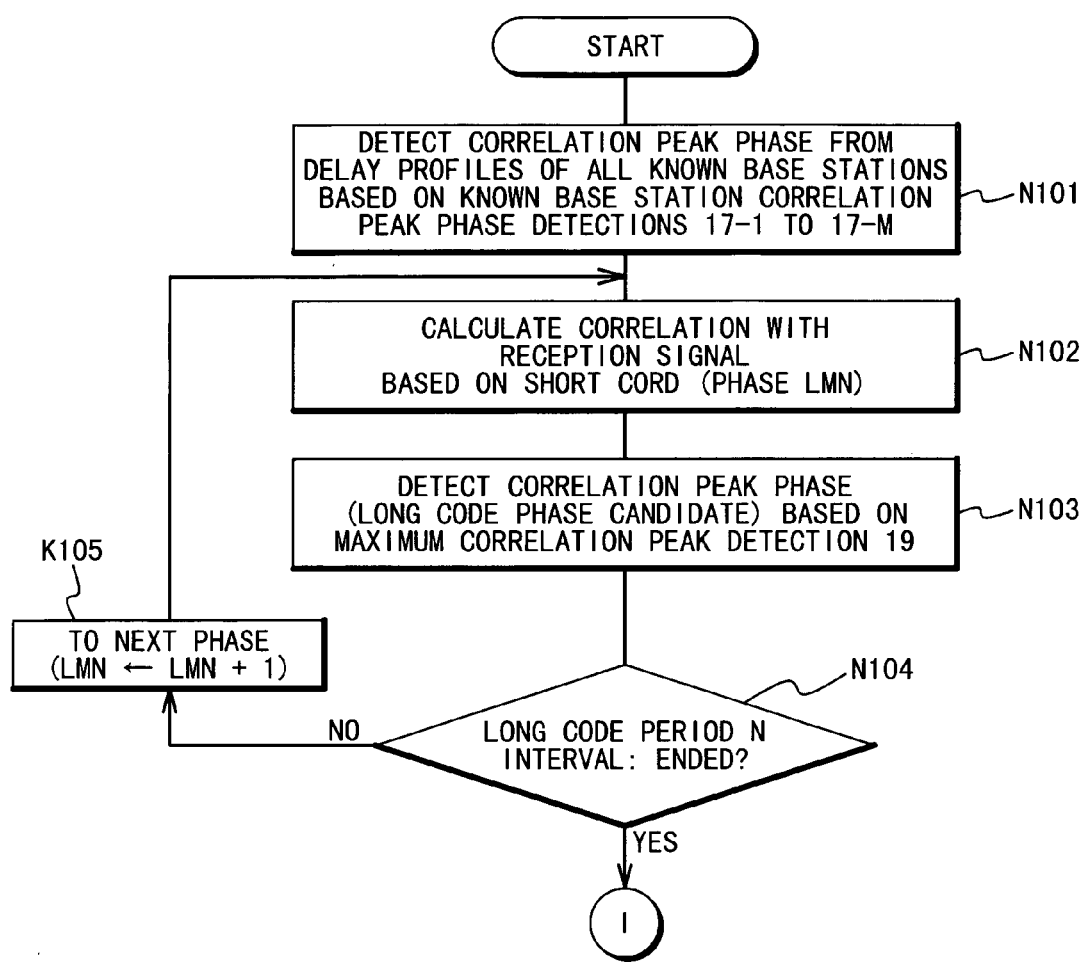
Figure 14B:
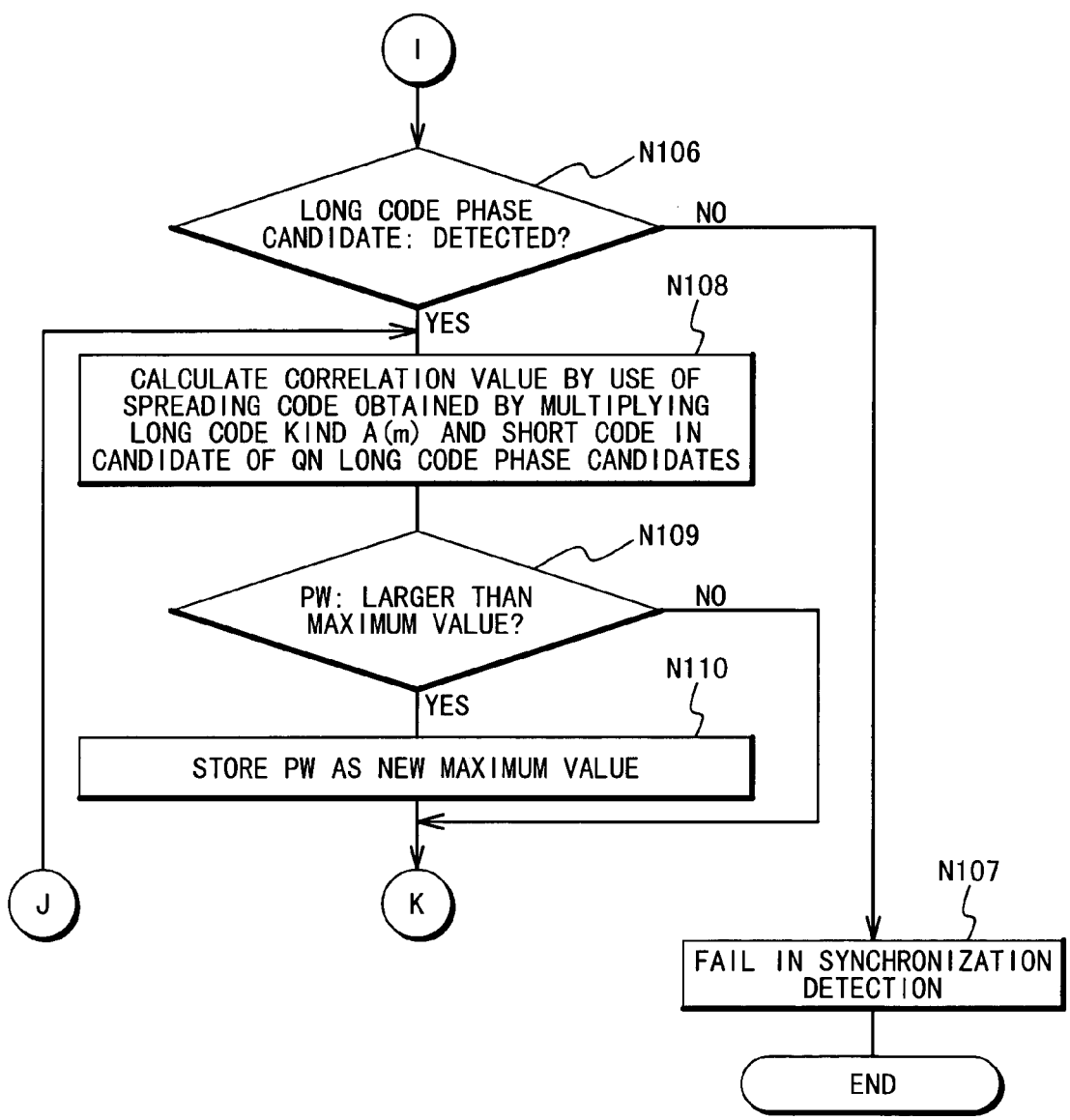

FIG. 11 is a block diagram showing the structure of a CDMA baseband receiver according to a second embodiment of the present invention. FIG. 12 is a flowchart illustrating the processing of a known base station correlation peak phase detecting unit according to the second embodiment. FIGS. 13A and 13B are flowcharts illustrating the processing of a maximum correlation peak phase detecting unit used in the second embodiment. FIGS. 14A, 14B, and 14C are flowcharts illustrating the procedures of a peripheral cell searching operation carried out when synchronization with one or more base stations is established in the second embodiment.

As shown in FIG. 11, the CDMA baseband receiver of the second embodiment is mainly composed of known base station correlation peak phase detecting units 17-1 to 17-$m$, a known base station correlation peak phase storage memory 18, a maximum correlation peak phase detecting unit 19, a short code generating unit 20, a correlating unit A 21, spreading code generating units 22-1 to 22-$m$, known base station delay profile generating units 23-1 to 23-$m$, a fundamental path detecting unit 24, demodulation correlating units 25-1 to 25-$k$, spreading code generating units 26-1 to 26-$k$, a RAKE synthesizing unit 27, a long code generating unit 28, a correlating unit B 29, and a threshold value evaluating unit 30.

Of these components, the short code generating units 20, the correlating unit A 21, the spreading code generating units 22-1 to 22-$m$, the known base station delay profile generating units 23-1 to 23-$m$, the fundamental path detecting unit 24, the demodulation correlating units 25-1 to 25-$k$, the spreading code generating units 26-1 to 26-$k$, the RAKE synthesizing unit 27, the long code generating unit 28, the correlating unit B29, and the threshold value evaluating unit 30 are the same as the short code generating unit 1, the correlating unit A 2, the spreading code generating units A 4-1 to 4-$m$, the known base station delay profile generating units 5-1 to 5-$m$, the fundamental path detecting unit 6, the demodulation correlating units 7-1 to 7-k, the spreading code generating units B 8-1 to 8-k, the RAKE synthesizing unit 9, the long code generating unit 11, the correlating unit B 12, and the threshold value evaluating unit 13, which are shown in the first embodiment. Thus, the detailed description thereof will be omitted.

In FIG. 11, the known base station correlation peak phase detecting units 31-1 to 31-m detect the phases of correlation peaks greater than a predetermined threshold from delay profiles DP1 to DPm of the known base stations generated by the known base station delay profile generating units 23-1 to 23-m. 25. The known base station correlation peak phase storage memory 18 stores the phases of the correlation peaks greater than the predetermined threshold. The maximum correlation peak phase detecting unit 19 detects top Q correlation values as the outputs of the correlating unit A 21 to obtain the correlation peak phases (long code phase candidates). In this case, when the obtained correlation peak phases are compared with the known base station correlation peak phases stored in the known base station correlation peak phase storage memory 18. When the obtained correlation phases are identified as known base station correlation peak phases, the obtained phases are not stored as correlation peak phase candidates. Furthermore, the maximum correlation peak phase detecting unit 19 has a function to carry out threshold evaluation of the correlation values as the outputs of the correlating unit A 21. With this function, it is possible to avoid correlation peak phases having small correlation values likely to be identified as noises are stored as the long code phase candidates. As a result, a high-speed peripheral cell searching operation can be achieved.

Next, referring to FIG. 12, the processing of the known base station correlation peak phase detecting units 17-1 to 17-m will be described below.

The phase of a correlation value obtained from an i-th known base station delay profile DP(i), and greater than the threshold Thi is stored in the known base station correlation peak phase storage memory 18 (step L102). The same process is repeated for the number of currently known base stations (step L103 and step L104).

Next, referring to FIGS. 13A and 13B, the processing of the maximum correlation peak phase detecting unit 19 used in the second embodiment will be described below.

Now, it is supposed that J known base station correlation peak phases from the delay profiles DP1 to DPm are stored in the known base station correlation peak phase storage memory 18. In this case, it is supposed that the correlating unit A 21 acquires a correlation value LPN at the phase LMN. The correlation value LPN is compared with a predetermined threshold (step M101). When the value LPN is found to be less than the threshold, the phase corresponding to the correlation value LPN is determined not to be a correlation peak phase.

When the correlation value LPN is found to be equal to or greater than the threshold, the correlation value LMN is compared with the phases stored in the known base station correlation peak phase storage memory 18 (step M102 to step M105). When the known base station correlation peak phase LB(i) is compared with the phase LMN, it is determined whether or not the phase LMN exists in a phase interval of the known base station correlation peak phase LB(i) and before and after the known base station correlation peak phase LB(i) by C chip periods in consideration that a peak exists to have a predetermined width (step M103). When the phase LMN exists in the C chip periods, the phase LMN is identified as a known base station correlation peak phase.

The above determination is carried out to each known base station correlation peak phases LB(i) (step M104 and step M105). When it is determined that the phase LMN does not coincide with any of the known base station correlation peak phases LB(i), the processing procedure advances to the next step M106 to step M114 to obtain long code phase candidates. Since the processing procedures of the step M106 to the step M114 are the same as those of the step S101 to the step S109 shown in FIG. 4, the detailed description thereof will be omitted.

Next, the operation of the CDMA baseband receiver shown in FIG. 11 will be described with reference to the flowcharts shown in FIGS. 14A, 14B, and 14C. In this case, since the processing procedure up to the initial base station synchronization establishing process is the same as those shown in FIGS. 8A and 8B in the first embodiment, the description thereof will be omitted. FIGS. 14A, 14B, and 14C show only the operation of the receiver at the time of peripheral cell searching operation conducted when synchronization with one or more base stations is established.

First, the known base station correlation peak phase detecting units 17-1 to 17-m detect the correlation peak phases of the known base stations from the delay profiles to store in the known base station correlation peak phase storage memory 18 (step N101). After this, the correlating unit A 21 carries out correlation calculation by use of only a short code (step N102). The maximum correlation peak phase detecting unit 19 acquires long code phase candidates through the process shown in FIGS. 13A and 13B (step N103). The detection of the long code phase candidates is carried out during the N chip periods as a long code period (step N104 and step N105). In this case, when no long code phase candidate is detected (step N106), the peripheral cell searching operation fails and the processing procedure is thereby terminated (step N107).

When one or more long code phase candidates are detected, the processing procedure advances to a long code identifying process (step N108 to step N117). Since the long code identifying process is the same as that in step T108 to step T117 in the first embodiment shown in FIGS. 10A, 10B and 10C, the detailed description thereof will be omitted.

In this way, in the CDMA baseband receiver of the second embodiment, the long codes of peripheral base stations other than the long codes of the known base stations can be detected reliably in the peripheral cell searching operation. In this case, since the correlation peak phases corresponding to correlation values below a predetermined threshold value are removed, synchronization with the peripheral base stations and detection of whether or not a peripheral base station exists can be both carried out at higher speed.

Third Embodiment

Figure 15:
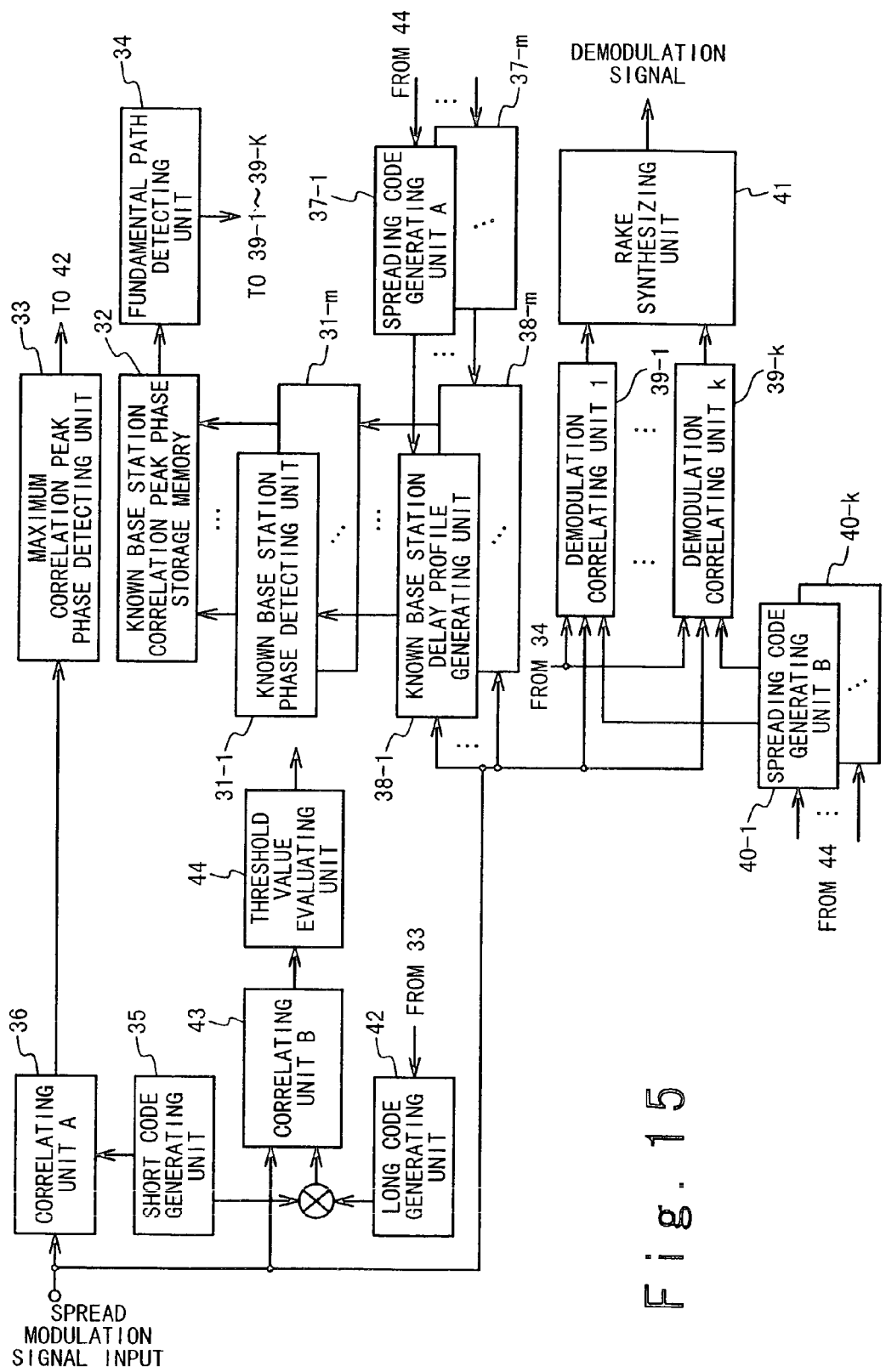
FIG. 15 is a block diagram showing the structure of a CDMA baseband receiver according to a third embodiment of the present invention.

FIG. 15 is a block diagram showing the structure of a CDMA baseband receiver according to a third embodiment of the present invention.

As shown in FIG. 15, the CDMA baseband receiver of the third embodiment is mainly composed of known base station correlation peak phase detecting units 31-1 to 31-m, a known base station correlation peak phase storage memory 32, a maximum correlation peak phase detecting unit 33, a fundamental path detecting unit 34, a short code generating unit 35, a correlating unit A 36, spreading code generating units A 37-1 to 37-m, known base station delay profile generating units 38-1 to 38-m, demodulation correlating units 39-1 to 39-k, spreading code generating units B 40-1 to 40-k, a RAKE synthesizing unit 41, a long code generating unit 42, a correlating unit B 43, and a threshold value evaluating unit 44.

Of these components, the short code generating units 35, the correlating unit A36, the spreading code generating units A 37-1 to 37-$m$, the known base station delay profile generating units 38-1 to 38-$m$, the demodulation correlating units 39-1 to 39-$k$, the spreading code generating units B 40-1 to 40-$k$, the RAKE synthesizing unit 41, the long code generating unit 42, the correlating unit B 43, and the threshold value evaluating unit 44 are the same as the short code generating unit 1, the correlating unit A2, the spreading code generating units A 4-1 to 4-$m$, the known base station delay profile generating units 5-1 to 5-$m$, the demodulation correlating units 7-1 to 7-$k$, the spreading code generating units B 8-1 to 8-$k$, the RAKE synthesizing unit 9, the long code generating unit 11, the correlating unit B 12, and the threshold value evaluating unit 13 of the first embodiment, which are shown in FIG. 2. Thus, the detailed description thereof will be omitted.

In FIG. 15, the known base station correlation peak phase detecting units 13-1 to 13-$m$, the known base station correlation peak phase storage memory 32, and the maximum correlation peak phase detecting unit 33 have the same functions as those of the known base station correlation peak phase detecting units 17-1 to 17-$m$, the known base station correlation peak phase storage memory 18, and the maximum correlation peak phase detecting unit 19 in the second embodiment, which are shown in FIG. 11.

The fundamental path detecting unit 34 detects a fundamental path from the storage contents of the known base station correlation peak phase storage memory 32 as a result obtained by the known base station correlation peak phase detecting units 13-1 to 13-$m$.

In this embodiment, processing procedure for detecting correlation peaks from the delay profiles can be carried out commonly to demodulating operation and a peripheral cell searching operation.

In this way, in the CDMA baseband receiver of the third embodiment, at the time of a peripheral cell searching operation, the long codes of peripheral base stations other than the long codes of the known base stations can be detected reliably. In this case, since the correlation peak phases of correlation values less than a predetermined threshold are removed, synchronization with the peripheral base stations and detection of the presence or absence of peripheral base stations can be both carried out at higher speed. In addition, in the CDMA baseband receiver of this embodiment, the processing procedure for detecting correlation peak phases from the delay profiles can be carried out commonly to the demodulating operation and a peripheral cell searching operation.

Fourth Embodiment

Figure 16:
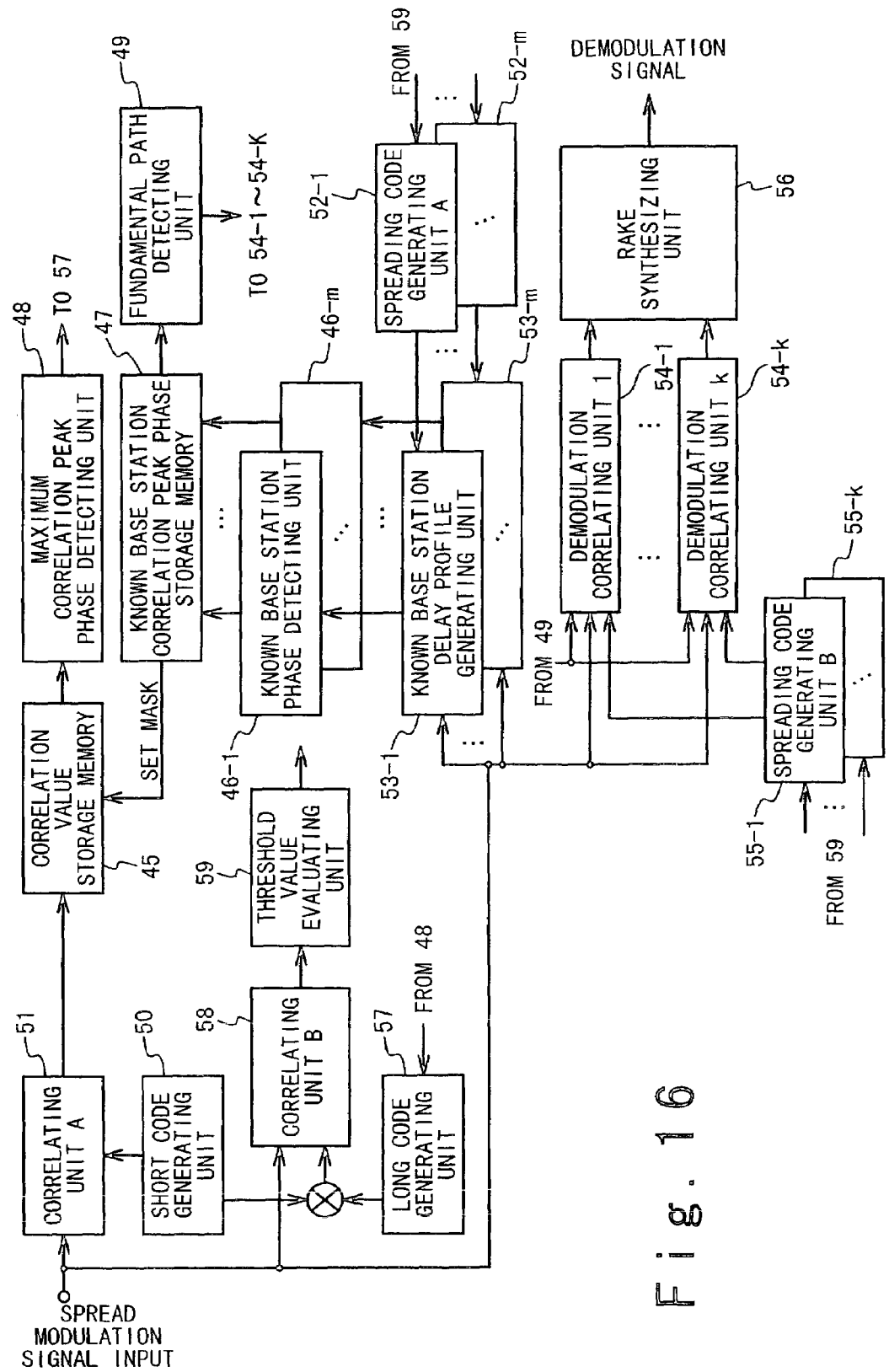
FIG. 16 is a block diagram showing the structure of a CDMA baseband receiver according to a fourth embodiment of the present invention.
Figure 17A:
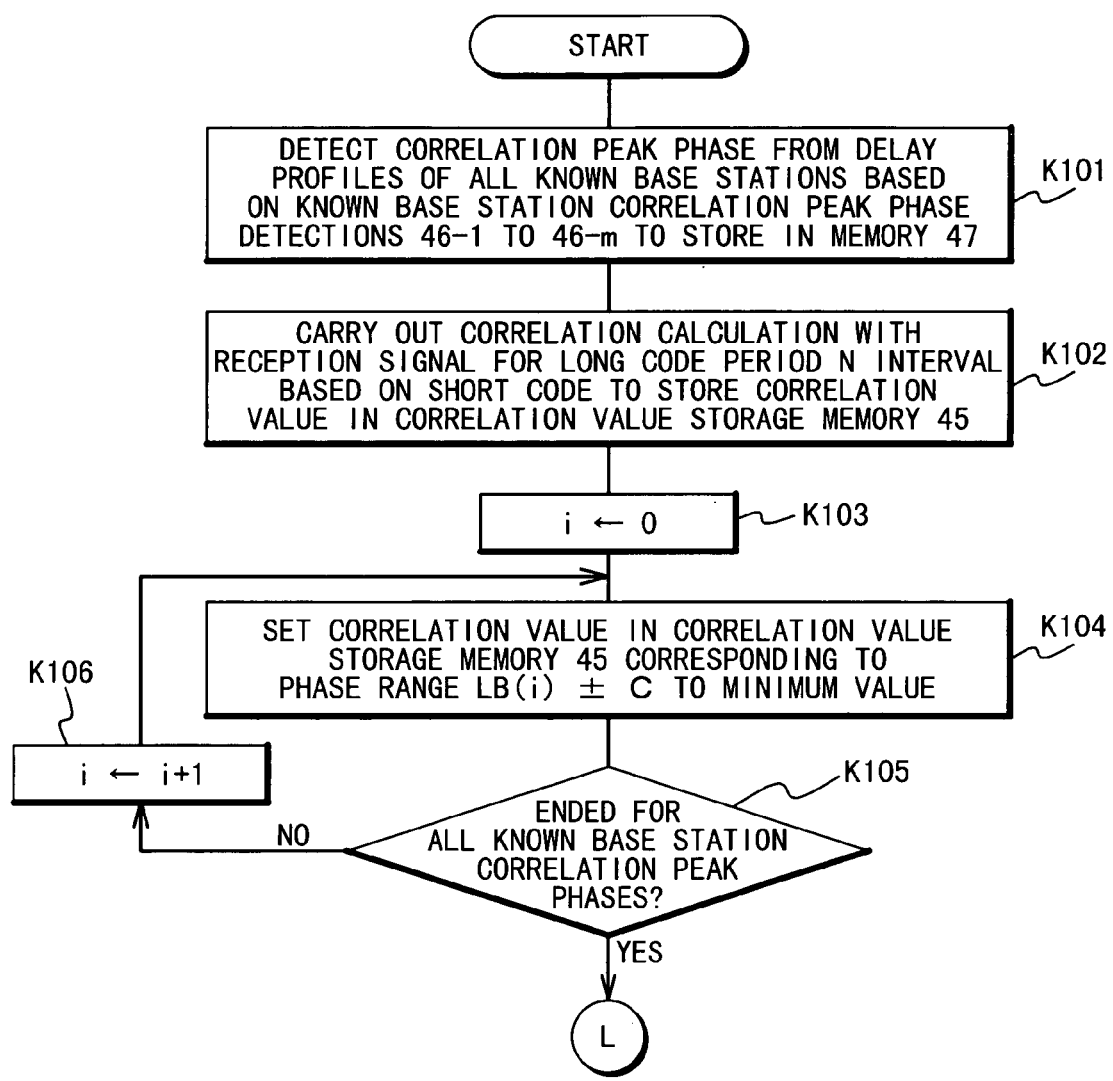
FIGS. 17A and 17B are flowchart illustrating the processing procedure of a peripheral cell searching operation carried out when synchronization with one or more base stations can be established in the fourth embodiment.
Figure 17B:
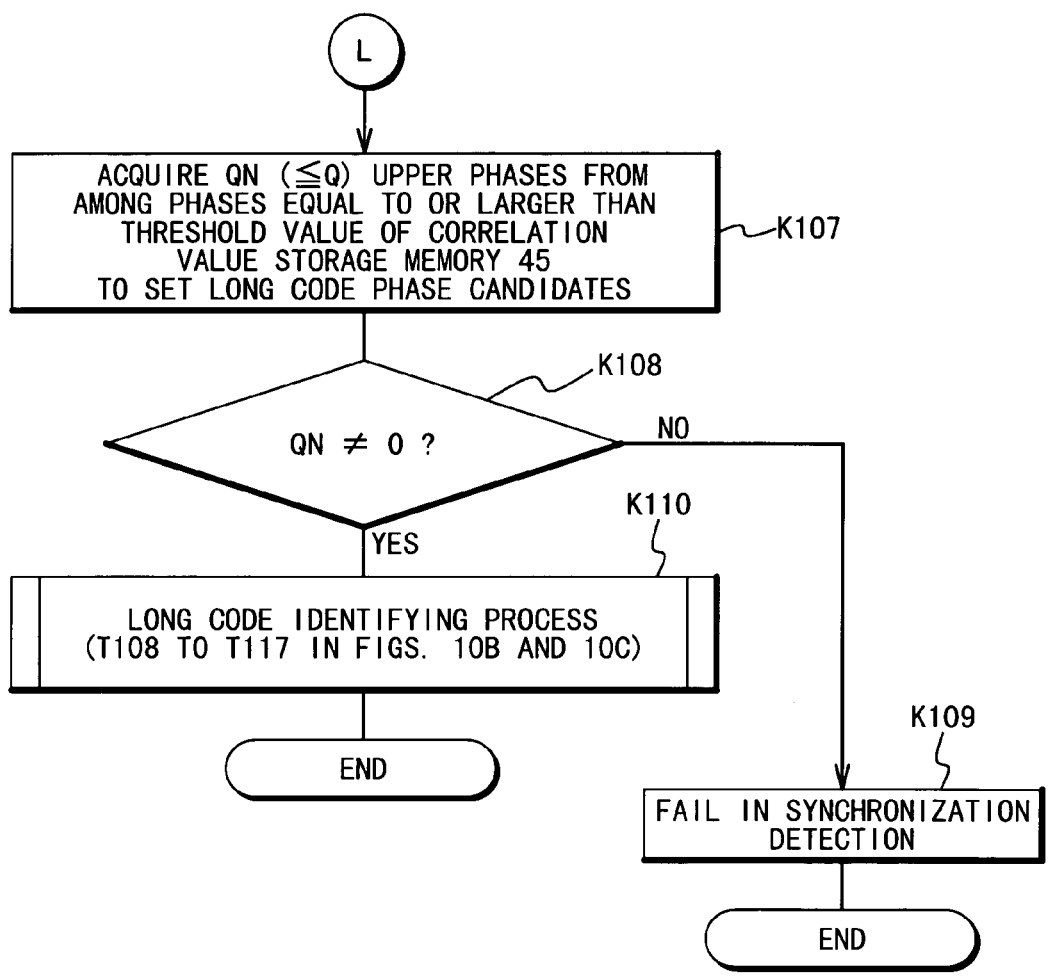

FIG. 16 is a block diagram showing the structure of a CDMA baseband receiver according to a fourth embodiment of the present invention. FIGS. 17A and 17B are flowcharts illustrating the processing procedure of a peripheral cell searching operation carried out in the fourth embodiment when synchronization with one or more base stations is established.

As shown in FIG. 16, the CDMA baseband receiver of the third embodiment is mainly composed of a correlation-value storage memory 45, known base station correlation peak phase detecting units 46-1 to 46-$m$, a known base station correlation peak phase storage memory 47, a maximum correlation peak phase detecting unit 48, a fundamental path detecting unit 49, a short code generating unit 50, a correlating unit A51, spreading code generating units A 52-1 to 52-$m$, known base station delay profile generating units 53-1 to 53-$m$, demodulation correlating units 54-1 to 54-$k$, spreading code generating units B 55-1 to 55-$k$, a RAKE synthesizing unit 56, a long code generating unit 57, a correlating unit B 58, and a threshold value evaluating unit 59.

Of these components, the short code generating unit 50, the correlating unit A51, the spreading code generating units A 52-1 to 52-$m$, the known base station delay profile generating units 53-1 to 53-$m$, the demodulation correlating units 54-1 to 54-$k$, the spreading code generating units B 55-1 to 55-$k$, the RAKE synthesizing unit 56, the long code generating unit 57, the correlating unit B58, and the threshold value evaluating unit 59 are the same as the short code generating unit 1, the correlating unit A2, the spreading code generating units A 4-1 to 4-$m$, the known base station delay profile generating units 5-1 to 5-$m$, the demodulation correlating units 7-1 to 7-$k$, the spreading code generating units B 8-1 to 8-$k$, the RAKE synthesizing unit 9, the long code generating unit 11, the correlating unit B 12, and the threshold value evaluating unit 13 of the first embodiment, which are shown in FIG. 2. Thus, the detailed description thereof will be omitted.

In FIG. 16, the known base station correlation peak phase detecting units 46-1 to 46-$m$, the known base station correlation peak phase storage memory 47, and the fundamental path detecting unit 49 have the same functions as those of the known base station correlation peak phase detecting units 31-1 to 31-$m$, the known base station correlation peak phase storage memory 32, and the fundamental path detecting unit 34 of the third embodiment, which are shown in FIG. 15.

The correlation value storage memory 45 stores all correlation values calculated by the correlating unit A51 in phases of N chip periods as a long code period. The maximum correlation peak phase detecting unit 48 detects the maximum Q phases corresponding to correlation values equal to or greater than a predetermined threshold from the outputs of the correlation value storage memory 45 in order of the greatest correlation value.

Next, the operation of the CDMA baseband receiver shown in FIG. 16 will be described with reference to the flowcharts shown in FIGS. 17A and 17B. In this case, the processing procedure up to the initial base station synchronization establishing process is the same as that of the first embodiment, which are shown in FIGS. 8A and 8B. Thus, the description of the processing procedure will be omitted, and only the operation of the receiver at the time of a peripheral cell searching operation conducted when synchronization with one or more base stations is established will be described.

First, the known base station correlation peak phase detecting units 46-1 to 46-$m$ detect the correlation peak phases for known base stations from delay profiles to store in the known base station correlation peak phase storage memory 47 (step K101).

After this, the peripheral cell searching operation is conducted. Correlation calculation is carried out by use of only a short code during N chip periods as a long code period, and correlation values obtained in phases are stored in the correlation value storage memory 45 (step K102).

The correlation values, within a range of ±C chip periods, of the known base station correlation peak phase LB (i) (i≦J) which is stored in the known base station correlation peak phase storage memory 47 is minimized in the correlation value storage memory 45. By this, it is prevented that the correlation peak phases of known base stations are detected, when long code phase candidates are detected. This processing procedure is carried out for all of the correlation peak phases LB(i). The correlation values in the correlation peak phases of known base stations are masked (step K103 to step K106). After this, top QN (QN≦Q) the correlation values equal to or greater than a predetermined threshold are selected from among the correlation values stored in the correlation value storage memory 47 and the phases corresponding to the correlation values are set as long code phase candidates (step K107). In this case, since the threshold evaluation is carried out, the number of long code phase candidates may be equal to or less than the value of Q.

In this case, when long code phase candidates are not detected, that is, the value of QN is equal to zero, it is determined that the peripheral cell searching operation fails, and the processing procedure is thereby terminated (step K109). When any long code phase candidates are detected, the processing procedure advances to the long code identifying process (step K110). The procedures of the long code identifying process is the same as that of the step T108 to the step T117 in the first embodiment, which are shown in FIGS. 10A, 10B, and 10C. Therefore, the detailed description thereof will be omitted.

In this way, in the CDMA baseband receiver of the fourth embodiment, the long codes of peripheral base stations other than the long codes of the known base stations can be detected reliably at the time of a peripheral cell searching operation. In addition, synchronization with the peripheral base stations and detection of the presence or absence of peripheral base stations can be both carried out at higher speed.

As described above, the detailed description of each of the embodiments of the present invention has been provided with reference to the drawings. However, the specific structure of the invention is not limited to these embodiments, and various modifications and changes in design may be made without departing from the scope of the present invention. For example, as shown in the second embodiment, the process carried out by the maximum correlation peak phase detecting unit 19, in which the correlation peak phases of small correlation values are regarded as noises and not determined as long code phase candidates, may be applied to one of the first and fourth embodiments. In this case, the process amount carried out at the time of threshold evaluation can be reduced, thereby leading to a high-speed peripheral cell searching operation.

As described above, in the CDMA baseband receiver of the present invention, the long codes of peripheral base stations other than the long codes of the known base stations can be detected reliably at the time of a peripheral-cell searching operation. In addition, both synchronization with the peripheral base stations and detection of the presence or absence of a peripheral base station can be carried out at higher speed. Furthermore, in this case, the correlation peak phases corresponding to correlation values less than a predetermined threshold are removed. Therefore, synchronization with the peripheral base stations and detection of the presence or absence of a peripheral base station can be carried out at higher speed.

What is claimed is:

1. A CDMA baseband receiving apparatus comprising:
a maximum correlation peak phase detecting section configured to detect as long code phase candidates, correlation peak phases having a plurality of larger ones of correlation values obtained by carrying out correlation calculation between a spread modulation signal and a short code over a plurality of long code periods;
a long code generating section configured to generate long codes corresponding to said long code phase candidates;
a threshold value determining section configured to detect a long code having a maximum one of correlation values obtained through correlation calculation between a spread code which is generated from said short code and said long code generated by said long code generating section, and said spread modulation signal, said long code having said correlation value more than a threshold value, and to determine said long code as a long code peculiar to a base station;
a known base station delay profile generating section configured to generate delay profiles for a plurality of base stations, from which signals are on reception, based on a spread code generated from said short code and said long code determined by said threshold value determining section; and
a main path detecting section configured to detect said correlation peak phases with said plurality of larger correlation values which are stored in said known base station delay profile generating section to supply to demodulation correlation section;
a section configured to delete said long code phase candidates having same phases as said plurality of larger ones of said correlation peak phases said correlation peak phase in the delay profile for said plurality of base stations on said reception from said long code phase candidates and detecting long code phase candidates.

2. The CDMA baseband receiving apparatus according to claim 1, further comprising:
a known base station phase detecting section configured to delete said long code phase candidates having same phases as said plurality of larger ones of said correlation peak phases in said delay profiles for said plurality of base stations on said reception from said long code phase candidates and for detecting long code phase candidates,
wherein said long code generating section generates the long codes in correspondence to said long code phase candidates outputted from said known base station phase detecting section, and
said main path detecting section detects said plurality of correlation peak phases corresponding to the plurality of larger correlation values from said delay profiles for the base stations on the reception and supplies to a demodulation correlation section.

3. The CDMA baseband reception apparatus according to claim 1, further comprising:
a known base station correlation peak phase detecting section configured to detect the correlation peak phases which exceed a preset threshold value from said delay profiles for a plurality of said base stations; and
a known base station correlation peak phase memory section configured to store the correlation peak phases detected by said known base station correlation peak phase detecting section,
wherein said maximum correlation peak phase detecting section detects as the long code phase candidates, the correlation peak phases obtained by deleting the correlation peak phases corresponding to the correlation peak phases stored in said known base station correlation peak phase memory section from the correlation peak phases with said plurality of larger correlation values of the correlation values of short code and a spread modulation signal during a plurality of long code periods, said long code generating section generates the long codes in correspondence to said long code phase candidates outputted from said maximum correlation peak phase detecting means, and said main path detecting section detects the correlation peak phases with the larger correlation values from said delay profiles for said base stations on the reception and supplies to said demodulation correlation section.

4. The CDMA baseband reception apparatus according to claim 1, further comprising:

a known base station correlation peak phase detecting section configured to detect the correlation peak phases which exceed a preset threshold value from said delay profiles for said base stations, and a known base station correlation peak phase memory section for storing the correlation peak phases detected by said known base station correlation peak phase detecting section, wherein said maximum correlation peak phase detecting section detects as the long code phase candidates, the correction peak phases obtained by deleting the correlation peak phases corresponding to the correlation peak phases stored in said known base station correlation peak phase memory section from the correlation peak phases with the plurality of larger correlation values of the correlation values of the short code and the spread modulation signal during the plurality of long code periods, said long code generating section generates long codes in correspondence to the long code phase candidates outputted from said maximum correlation peak phase detecting section, and said main path detecting section detects the correlation peak phases of the plurality of larger correlation values form the correlation peak phases stored in said known base station correlation peak phase memory section and supplies to said demodulation correlation section.

5. The CDMA baseband reception apparatus according to claim 3, wherein said maximum correlation peak phase detecting section detects and stores the long code phase candidates the correlation peak phases remained when the correlation peak phases which do not exceed the preset threshold value are detected.

6. The CDMA baseband reception apparatus according to claim 4, wherein said maximum correlation peak phase detecting section detects and stores the long code phase candidates the correlation peak phases remained when the correlation peak phases which do not exceed the preset threshold value are detected.

7. The CDMA baseband reception apparatus according to claim 1, further comprising;

a known base station correlation peak phase detecting section configured to detect the correlation peak phases which exceed a preset threshold value from said delay profiles for the plurality of base stations;

a known base station correlation peak phase memory section configured to store the correlation peak phases detected by said known base station correlation peak phase detecting section; and a correlation value memory section configured to store the correlation values of the short code and the diffusion modulation signal during the plurality of long code periods by masking the correlation values of the correlation peak phases stored in said known base station correlation peak phase memory section, wherein said maximum correlation peak phase detecting section stores the correlation peak phases of the plurality of larger ones of the correlation values stored in said correlation value memory section as the long code phase candidates, said long code generating section generates the long codes in correspondence to the long code phase candidates outputted from said maximum correlation peak phase detecting section, and said main path detecting section detects the correlation peak phases of the plurality of larger correlation values from the correlation peak phases stored in said known base station correlation peak phase memory section and supplies to said demodulation correlation section.

8. The CDMA baseband reception apparatus according to claim 1, wherein said threshold value determining section takes the maximum correlation value of the next larger phase candidate when the maximum correlation value is smaller than the preset threshold value, and detects and determines the long code with the correlation value larger than the preset threshold value as the long code peculiar to the base station.

* * * * *

UNITED STATES PATENT AND TRADEMARK OFFICE
CERTIFICATE OF CORRECTION

PATENT NO.      : 6,954,485 B1
APPLICATION NO. : 09/677775
DATED           : October 11, 2005
INVENTOR(S)     : Takeshi Hashimoto and Yuichi Maruyama It is certified that error appears in the above-identified patent and that said Letters Patent is hereby corrected as shown below:

Col. 3, line 51, delete " #0 "

Signed and Sealed this

Twentieth Day of February, 2007

JON W. DUDAS
*Director of the United States Patent and Trademark Office*